(12) United States Patent
Yao et al.

(10) Patent No.: US 9,236,766 B2
(45) Date of Patent: Jan. 12, 2016

(54) CONTROL OF A POWER ADAPTER WITH ENERGY STORAGE ELEMENTS BASED ON OUTPUT VOLTAGE THRESHOLDS

(75) Inventors: Ling Yao, Beijing (CN); Bo Song, Beijing (CN); Xiaoren Cheng, Beijing (CN); Weizhi Lin, Beijing (CN); Shuangcheng Zhao, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 483 days.

(21) Appl. No.: 13/578,649

(22) PCT Filed: Jan. 28, 2011

(86) PCT No.: PCT/CN2011/070757
§ 371 (c)(1),
(2), (4) Date: Aug. 13, 2012

(87) PCT Pub. No.: WO2011/098000
PCT Pub. Date: Aug. 18, 2011

(65) Prior Publication Data
US 2012/0311354 A1 Dec. 6, 2012

(30) Foreign Application Priority Data

Feb. 11, 2010 (CN) .......................... 2010 1 0111948
Mar. 4, 2010 (CN) .......................... 2010 1 0118586
Mar. 25, 2010 (CN) .......................... 2010 1 0134376

(51) Int. Cl.
G06F 1/26 (2006.01)
H02J 9/00 (2006.01)
G06F 1/32 (2006.01)
G06F 1/28 (2006.01)

(52) U.S. Cl.
CPC . *H02J 9/005* (2013.01); *G06F 1/32* (2013.01); *G06F 1/26* (2013.01); *G06F 1/28* (2013.01)

(58) Field of Classification Search
CPC ............. G06F 1/26; G06F 1/263; G06F 1/28; G06F 1/3203
USPC .......................................................... 713/300
See application file for complete search history.

(56) References Cited

U.S. PATENT DOCUMENTS 5,028,861 A * 7/1991 Pace et al. ...................... 323/222
6,181,030 B1 1/2001 Carpenter et al.
(Continued)

FOREIGN PATENT DOCUMENTS

CN 1083585 C 4/2002
CN 2650194 10/2004
(Continued)

OTHER PUBLICATIONS

PCT/CN2011/070757 International Preliminary Report on Patentability dated Aug. 14, 2012 (5 pages).
(Continued)

*Primary Examiner* — Thomas Lee
*Assistant Examiner* — Danny Chan
(74) *Attorney, Agent, or Firm* — Brinks Gilson & Lione; G. Peter Nichols

(57) ABSTRACT

A power adapter for a portable computer includes a pulse width modulation unit and an output shaping unit and further includes a first judgment module that judges whether the portable computer is in a first state according to state judging parameters, and compares an output voltage with a first preset voltage and a second preset voltage when judging that the portable computer is in the first state, and acquires a judging result, wherein the first preset voltage is greater than or equal to the second preset voltage. The power adapter can increase efficiency.

22 Claims, 7 Drawing Sheets

(56) References Cited

U.S. PATENT DOCUMENTS

| | | | |
|---|---|---|---|
| 7,656,141 B1* | 2/2010 | Granat | 323/284 |
| 2002/0011823 A1* | 1/2002 | Lee | 320/137 |
| 2002/0023235 A1* | 2/2002 | Odaohhara | 713/320 |
| 2003/0090236 A1* | 5/2003 | Odaohhara et al. | 320/134 |
| 2007/0076456 A1 | 4/2007 | Lim | |
| 2007/0262651 A1 | 11/2007 | Odaohara | |
| 2008/0252265 A1* | 10/2008 | Kokubun et al. | 320/162 |
| 2009/0150694 A1* | 6/2009 | Motomiya et al. | 713/320 |

FOREIGN PATENT DOCUMENTS

| | | |
|---|---|---|
| CN | 1633017 | 6/2005 |
| CN | 101128791 A | 2/2008 |
| CN | 101299164 | 11/2008 |
| CN | 101662221 | 3/2010 |
| JP | 6-327165 A | 11/1994 |
| JP | 2010-009538 A | 1/2010 |
| TW | 200820572 A | 5/2008 |

OTHER PUBLICATIONS

PCT/US2011/070757 International Search Report dated May 5, 2011 (2 pages).

Chinese First Office Action with English Translation for related Application No. 201010118586.3 dated Apr. 27, 2013, 26 pages.

Chinese First Office Action with English Translation for related Application No. 201010111948.6 dated Feb. 27, 2013, 25 pages.

* cited by examiner

CONTROL OF A POWER ADAPTER WITH ENERGY STORAGE ELEMENTS BASED ON OUTPUT VOLTAGE THRESHOLDS

TECHNICAL FIELD

The present disclosure relates to power supplying technology of an electronic device, in particular to a power adapter and a portable computer.

BACKGROUND

Recently, as energy-saving standards, such as "energy star", continuously appear and upgrade, seven countries and regions (USA, Canada, Japan, Taiwan China, Australia, New Zealand and European Union) in the world have participated an energy star plan proposed by U.S. Environmental Protection Agency.

The energy-saving of the electronic device has been known and accepted by global consumers and becomes a necessary condition for selecting products.

Currently, states of a power supply include several states of S0, S1, S2, S3, S4 and S5, and their descriptions are as follows.

S0: a general operation state in which all devices are turned on.

S1: this state represents that a system is in a low power supplying state in which a CPU is turned off, other device operates normally, and a computer may be woken up by a mouse, a keyboard and the like.

S2: a stand-by state of the power supply which is different from the S1 in that a bus clock is turned off too in the S2.

S3: in this state, all of data stored in memory by an Operating System are maintained and the system enters a "false turned off" state. At this time, power supplied to other devices and apparatuses are cut off, except for the power supplied to the memory for maintaining the data.

S4: the data of the Operating System in the memory is entirely stored into a hard disk, and all of parts stop operate.

S5: a power-off state in which all of the devices are turned off.

Periods of time taken for waking up the computer in S1 to S5 increase sequentially.

The existing adapter comprises both a pulse width modulation unit and an output shaping unit having energy storage elements such as capacitors, inductors, etc. During an operation process of the adapter, these energy storage elements may store some energy and the stored energy can not be sufficiently used to supply power, such that an efficiency of the adapter is low.

SUMMARY

An object of the present disclosure is to provide a power adapter and a portable computer which may improve the efficiency of the adapter.

The object of the present disclosure is also to provide a power adapter and a portable computer which may reduce energy consumption during the power adapter is not detached.

The object of the present disclosure is further to provide a power adapter and a portable computer which may reduce energy consumption.

An embodiment of the present disclosure provides a power adapter for supplying power to a portable computer and comprising a pulse width modulation unit and an output shaping unit whose initial states are operation states, wherein the power adapter further comprises:

a first acquisition module for acquiring an output voltage of the output shaping unit, a first judgment module for judging relationships between the output voltage and a first preset voltage threshold and a second preset voltage threshold and obtaining a judgment result, the first preset voltage threshold being larger than or equal to the second preset voltage threshold;

a first control module for controlling the pulse width modulation unit to be in a turned-off state when the judgment result indicates that the output voltage is larger than the first preset voltage threshold, and for controlling the pulse width modulation unit to be in the operation state when the judgment result indicates that the output voltage is smaller than the second preset voltage threshold.

The above-described power adapter further comprises:

a second acquisition module for acquiring a state judging parameter of the portable computer; and the first judgment module judges whether the portable computer is in a first state according to the state judging parameter, and judges the relationships between the output voltage and the first preset voltage threshold and the second preset voltage threshold and obtains the judgment result when it is judged that the portable computer is in the first state;

the first control module is used to control the pulse width modulation unit to be in the turned-off state when the portable computer is in the first state and the output voltage is larger than the first preset voltage threshold, and to control the pulse width modulation unit to be in the operation state when the portable computer is in the first state and the output voltage is smaller than the second preset voltage threshold.

In the above-described power adapter, when the portable computer comprises a chargeable power supply internally, the power adapter further comprises:

a third acquisition module for interacting with the portable computer so as to acquire a battery state judging parameter;

a second control module for turning off the first control module when it is judged that the chargeable power supply is in a charging state according to the battery state judging parameter, and turning on the first control module otherwise.

In the above-described power adapter, the state judging parameter includes:

state parameter of the portable computer; or current power consumption of the portable computer; or the current power consumption and duration of the portable computer.

In the above-described power adapter, the state judging parameter includes the current power consumption of the portable computer, and the first judgment module further comprises:

a first unit for comparing the current power consumption and a first threshold;

a second unit for judging a current state of the portable computer as the first state when the current power consumption is smaller than the first threshold;

wherein the first threshold is a maximum power consumption in the first state of the portable computer, or a sum of the maximum power consumption and a margin threshold.

In the above-described power adapter, the state judging parameter includes the current power consumption and duration of the portable computer, and the first judgment module further comprises:

a first unit for comparing the current power consumption and a first threshold;

a third unit for judging a current state of the portable computer as the first state when the current power consumption is smaller than the first threshold and the duration exceeds a second time threshold;

wherein the first threshold is a maximum power consumption in the first state of the portable computer, or a sum of the maximum power consumption and a margin threshold.

The above-described power adapter further comprises:

a resistance element disposed on an output channel of the output shaping unit;

the second acquisition module further comprises:

a current detection element for detecting the current of the resistance element;

a voltage detection element for detecting the output voltage of the output shaping unit;

wherein the current power consumption of the portable computer is a product of the current of the resistance element and the output voltage of the output shaping unit.

In the above-described power adapter, a first switch which is in a turned-on state initially is further disposed in the power adapter, the first control module is connected with the first switch and is used to cause the pulse width modulation unit being in the turned-off state or the operation state by controlling the first switch to be turned off or on, respectively.

The above-described power adapter further comprises:

a duration monitoring module for monitoring a duration during which the portable computer is in the first state when the first judgment module judges that the portable computer is in the first state according to the state judging parameter;

a third control module for controlling the first control module to be turned off and controlling the first switch to be turned off, when the duration during which the portable computer is in the first state exceeds a first preset period.

The above-described power adapter further comprises:

a notification module for transmitting a close instruction to the portable computer in order to make the portable computer be powered-off when the duration during which the portable computer is in the first state exceeds a second preset period.

In the above-described power adapter, the portable computer comprises a build-in power supply for supplying power, the power adapter further comprises:

a first power supplying module for supplying power to the portable computer;

a second switch which is disposed on a power supplying loop of the first power supplying module and is in a turned-on state initially;

a fourth acquisition module for acquiring a switch control parameter of the second switch;

a second judgment module for judging whether the build-in power supply can support the portable computer to operate in the current state for a third preset period according to the switch control parameter;

a fourth control module for controlling the second switch to be turned off when the build-in power supply can support the portable computer to operate in the current state for the third preset period, and controlling the second switch to be turned on otherwise.

In the above-described power adapter, the switch control parameter includes a first parameter and a second parameter.

The second judgment module is used to judge whether the current state of the portable computer is a second state in which the power consumption of the portable computer is lower than a preset value, according to the first parameter and the second parameter, and to judge whether the build-in power supply can support the portable computer to operate in the current state for the third preset period when it is judged that the portable computer is in the second state;

the fourth control module is used to control the second switch to be turned off when the current state of the portable computer is the second state and the build-in power supply can support the portable computer to operate in the current state for the third preset period, and controlling the second switch to be turned on otherwise.

In above-described power adapter, when the portable computer comprises a chargeable power supply internally, the power adapter further comprises:

a fifth acquisition module for interacting with the portable computer so as to acquire a battery state judging parameter;

a fifth control module for turning off the fourth control module when it is judged that the chargeable power supply is in a charging state according to the battery state judging parameter, and turning on the fourth control module otherwise.

In the above-described power adapter, the first parameter includes:

state parameter of the portable computer; or current power consumption of the portable computer; or the current power consumption and duration of the portable computer.

In the above-described power adapter, the first parameter is the current power consumption of the portable computer, and the second judgment module comprises:

a fourth unit for comparing the current power consumption and a second threshold;

a fifth unit for judging a current state of the portable computer as the second state when the current power consumption is smaller than the second threshold;

the second threshold is a maximum power consumption in the second state of the portable computer, or a sum of the maximum power consumption and a margin threshold.

In the above-described power adapter, the first parameter includes the current power consumption and duration of the portable computer, and the second judgment module comprises:

a fourth unit for comparing the current power consumption and a second threshold;

a sixth unit for judging a current state of the portable computer as the second state when the current power consumption is smaller than the second threshold and the duration exceeds a fourth time threshold;

the second threshold is a maximum power consumption in the second state of the portable computer, or a sum of the maximum power consumption and a margin threshold.

In the above-described power adapter, the first power supplying module comprises a conversion unit, and the second switch is disposed on a power supplying loop between the conversion unit and a main plug.

The above-described power adapter further comprises:

a second power supplying module for supplying power to the portable computer;

a sixth acquisition module for acquiring a mode judging parameter;

a third judgment module for judging a current state of the portable computer according to the mode judging parameter;

a six control module for controlling an output voltage of the second power supplying module according to the current state of the portable computer, so that the voltage output by the second power supplying module when the current state of the portable computer is a third state is larger than the voltage output by the second power supplying module when the current state of the portable computer is a fourth state;

a power consumption in the third state of the portable computer being larger than that in the fourth state of the portable computer.

The above-described power adapter further comprises:

a seventh acquisition module for interacting with the portable computer so as to acquire a battery state judging parameter;

a seventh control module for turning off the sixth control module when it is judged that the portable computer is connected with a chargeable power supply which is in a charging state according to the battery state judging parameter, and turning on the sixth control module otherwise.

In the above-described power adapter, the mode judging parameter is a state parameter of the portable computer.

In the above-described power adapter, the mode judging parameter is the current power consumption of the portable computer, and the third judgment module further comprises:

a seventh unit for comparing the current power consumption and a third threshold and a fourth threshold;

a eighth unit for judging the current state of the portable computer as the third state when the current power consumption is larger than or equal to the third threshold;

a ninth unit for judging the current state of the portable computer as the fourth state when the current power consumption is smaller than or equal to the fourth threshold;

the third threshold is a minimum power consumption in the third state of the portable computer;

the fourth threshold is a maximum power consumption in the fourth state of the portable computer, or a sum of the maximum power consumption and a margin threshold.

In the above-described power adapter, the mode judging parameter includes the current power consumption and duration of the portable computer, and the third state judgment module further comprises:

a seventh unit for comparing the current power consumption and a third threshold and a fourth threshold;

a tenth unit for judging a current state of the portable computer as the third state when the current power consumption is larger than or equal to the third threshold and the duration exceeds a fifth time threshold;

a eleventh unit for judging the current state of the portable computer as the fourth state when the current power consumption is smaller or equal to the fourth threshold and the duration exceeds a sixth time threshold;

wherein the third threshold is a minimum power consumption in the third state of the portable computer;

the fourth threshold is a maximum power consumption in the fourth state of the portable computer, or a sum of the maximum power consumption and a margin threshold.

In the above-described power adapter, the mode judging parameter further comprises the state parameter of the portable computer, and the third state judgment module further comprises:

a twelfth unit for judging the current state of the portable computer according to the state parameter when the current power consumption is smaller than the third threshold and larger than the fourth threshold.

A further embodiment of the present disclosure provides a power adapter including a pulse width modulation unit and an output shaping unit, wherein the above-described power adapter further comprises:

a instruction receiving module for receiving a first control instruction or a second control instruction transmitted from a portable computer, the first control instruction is an instruction transmitted when the portable computer is in a first state and an output voltage of the output shaping unit is larger than a first preset voltage threshold, the second control instruction is an instruction transmitted when the portable computer is in the first state and an output voltage of the above-described power adapter is smaller than a second preset voltage threshold, the first preset voltage threshold being larger than or equal to the second preset voltage threshold;

a first control module for controlling the pulse width modulation unit to be in a turned-off state when the instruction receiving unit receives the first control instruction, and for controlling the pulse width modulation unit to be in a turned-on state when the instruction receiving unit receives the second control instruction.

A switch which is in a turned-on state initially is further disposed in the above-described power adapter, the first control module is connected with the switch and is used to make the pulse width modulation unit in a turned-off state or an operation state by controlling the switch to be turned-off or turned-on, respectively.

Another embodiment of the present disclosure provides a power adapter used for supplying power to a portable computer in which a build-in power supply is disposed, wherein the power adapter comprises:

a first power supplying module for supplying power to the portable computer;

a switch disposed in a power supplying loop of the first power supplying module and being in a turned-on state initially;

a first acquisition module for acquiring a switch control parameter;

a first judgment module for judging whether the build-in power supply can support the portable computer to operate in a current state for a first preset period according to the switch control parameter;

a first control module for controlling the switch to be turned off when the build-in power supply can support the portable computer to operate in the current state for the first preset period, and controlling the switch to be turned on otherwise.

The above-described power adapter further comprises:

a second acquisition module for acquiring a mode judging parameter;

a second judgment module for judging a current state of the portable computer according to the mode judging parameter;

a second control module for controlling an output voltage of the build-in power supply according to the current state of the portable computer, so that the voltage output by the build-in power supply when the current state of the portable computer is a first state is larger than the voltage output by the build-in power supply when the current state of the portable computer is a second state;

a power consumption in the first state of the portable computer being larger than that in the second state of the portable computer.

Another embodiment of the present disclosure provides a power adapter used for supplying power to a portable computer, wherein the power adapter comprises:

a first power supplying module for supplying power to the portable computer;

a switch disposed in a power supplying loop of the first power supplying module and being in a turned-on state initially;

a first control module for controlling the switch to be turned off upon receiving a control instruction issued after the portable computer judges that a build-in power supply can support the portable computer to operate in the current state for a first preset period, and controlling the switch to be turned on otherwise.

In the above-described power adapter, the control instruction is an instruction transmitted when the current state of the portable computer is a first state and the build-in power supply can support the portable computer to operate in the current state for the first preset period, a power consumption in the first state of the portable computer is smaller than a preset value.

Another embodiment of the present disclosure provides a power adapter used for supplying power to a portable computer, wherein the power adapter comprises:

a first power supplying module for supplying power to the portable computer;

a first acquisition module for acquiring a mode judging parameter;

a first judgment module for judging a current state of the portable computer according to the mode judging parameter;

a first control module for controlling an output voltage of the first power supplying module according to the current state of the portable computer, so that the voltage output by the first power supplying module when the current state of the portable computer is a first state is larger than the voltage output by the first power supplying module when the current state of the portable computer is a second state;

a power consumption in the first state of the portable computer being larger than that in the second state of the portable computer.

The above-described power adapter further comprises:

a pulse width modulation unit and an output shaping unit whose initial states are operation states;

a second acquisition module for acquiring an output voltage of the output shaping unit, a second judgment module for judging relationships between the output voltage and a first preset voltage threshold and a second preset voltage threshold and obtaining a judgment result, the first preset voltage threshold being larger than or equal to the second preset voltage threshold;

a second control module for controlling the pulse width modulation unit to be in a turned-off state when the first judgment module judges that the current state of the portable computer is a second state and the second judgment module judges that the output voltage is larger than the second preset voltage threshold, and for controlling the pulse width modulation unit to be in the operation state otherwise.

In the above-described power adapter, the portable computer comprises a build-in power supply for supplying power, the power adapter further comprises:

a switch disposed in a power supplying loop of the first power supplying module and being in a turned-on state initially;

a third acquisition module for acquiring a switch control parameter;

a third judgment module for judging whether the build-in power supply can support the portable computer to operate in a current state for a first preset period according to the switch control parameter;

a third control module for controlling the switch to be turned off when the first judgment module judges that the current state of the portable computer is the second state and the second judgment module judges that the build-in power supply can support the portable computer to operate in the current state for the first preset period, and controlling the switch to be turned on otherwise.

Another embodiment of the present disclosure provides a power adapter used for supplying power to a portable computer, wherein the power adapter comprises:

a first power supplying module for supplying power to the portable computer;

a first control module for controlling the first power supplying module upon receiving a control instruction transmitted by the portable computer according to the current state of the portable computer, so that the voltage output by the first power supplying module when the current state of the portable computer is a first state is larger than the voltage output by the first power supplying module when the current state of the portable computer is a second state;

a power consumption in the first state of the portable computer being larger than that in the second state of the portable computer.

Another embodiment of the present disclosure provides a portable computer, comprising:

a first acquisition module for acquiring a state judging parameter and an output voltage of a power adapter;

a first judgment module for judging whether the portable computer is in a first state according to the state judging parameter, and judging relationships between the output voltage and a first preset voltage threshold and a second preset voltage threshold and obtaining a judgment result when it is judged that the portable computer is in the first state, the first preset voltage threshold being larger than or equal to the second preset voltage threshold;

a first control module for transmitting a first control instruction to the power adapter, which makes a pulse width modulation unit in the power adapter in a turned-off state, when the judgment result indicates that the output voltage is larger than the first preset voltage threshold, and for transmitting a second control instruction to the power adapter, which makes the pulse width modulation unit in the power adapter in a operation state, when the judgment result indicates that the output voltage is smaller than the second preset voltage threshold.

A further embodiment of the present disclosure provides a portable computer having a build-in power supply, the portable computer comprises:

a first acquisition module for acquiring a switch control parameter;

a first judgment module for judging whether the build-in power supply can support the portable computer to operate in a current state for a first preset period according to the switch control parameter;

a first control module for transmitting a control instruction, which is used to make the power adapter turn off a switch according to the control instruction so that the build-in power supply supplies power, when the build-in power supply can support the portable computer to operate in the current state for the first preset period;

wherein the switch is disposed in a power supplying loop of a power supplying module in the power adapter and is in a turned-on state initially.

In the above-described portable computer, the portable computer comprises a chargeable power supply internally, and the portable computer further comprises:

a second acquisition module for acquiring a battery state judging parameter;

a second control module for turning off the first control module when it is judged that the chargeable power supply is in a charging state according to the battery state judging parameter, and turning on the first control module otherwise.

A still embodiment of the present disclosure provides a portable computer, wherein the portable computer comprises:

a first acquisition module for acquiring a mode judging parameter;

a first judgment module for judging a current state of the portable computer according to the mode judging parameter;

a first control module for transmitting a control instruction to a power adapter in order to control an output voltage of the power adapter according to the current state of the portable computer, so that the voltage output by the power adapter when the current state of the portable computer is a first state is larger than the voltage output by the power adapter when the current state of the portable computer is a second state;

a power consumption in the first state of the portable computer being larger than that in the second state of the portable computer.

The portable computer further comprises:

a second acquisition module for acquiring a battery state judging parameter;

a second control module for turning off the first control module when it is judged that the portable computer is connected with a chargeable power supply which is in a charging state according to the battery state judging parameter, and turning on the first control module otherwise.

In the above-described portable computer, the mode judging parameter is a current power consumption of the portable computer, and the first judgment module further comprises:

a first unit for comparing the current power consumption and a first threshold and a second threshold;

a second unit for judging a current state of the portable computer as the first state when the current power consumption is larger than or equal to the first threshold;

a third unit for judging the current state of the portable computer as the second state when the current power consumption is smaller than or equal to the second threshold;

wherein the first threshold is a minimum power consumption in the first state of the portable computer;

the second threshold is a maximum power consumption in the second state of the portable computer, or a sum of the maximum power consumption and a margin threshold.

In the above-described portable computer, the state judging parameter includes the current power consumption and duration of the portable computer, and the first judgment module comprises:

a first unit for comparing the current power consumption and a first threshold and a second threshold;

a fourth unit for judging a current state of the portable computer as the first state when the current power consumption is larger than or equal to the first threshold and the duration exceeds a first time threshold;

a fifth unit for judging the current state of the portable computer as the second state when the current power consumption is smaller than or equal to the second threshold and the duration exceeds a second time threshold;

wherein the first threshold is a minimum power consumption in the first state of the portable computer;

the second threshold is a maximum power consumption in the second state of the portable computer, or a sum of the maximum power consumption and a margin threshold.

In the above-described portable computer, the mode judging parameter further comprises a state parameter of the portable computer, and the first judgment module further comprises:

a sixth unit for judging the current state of the portable computer according to the state parameter when the current power consumption is smaller than the first threshold and larger than the second threshold.

A still embodiment of the present disclosure provides a portable computer having a mainboard, wherein the portable computer further comprises:

a first power supplying module which is connected with the mainboard and is used to supply power to the mainboard after acquiring power from an adapter;

a first acquisition module for acquiring a mode judging parameter;

a first judgment module for judging a current state of the portable computer according to the mode judging parameter;

a first control module for controlling an output voltage of the first power supplying module according to the current state of the portable computer, so that the voltage output by the first power supplying module when the current state of the portable computer is a first state is larger than the voltage output by the first power supplying module when the current state of the portable computer is a second state;

a power consumption in the first state of the portable computer is larger than that in the second state of the portable computer.

The above-described portable computer further comprises:

a second acquisition module for acquiring a battery state judging parameter;

a second control module for turning off the first control module when it is judged that the portable computer is connected with a chargeable power supply which is in a charging state according to the battery state judging parameter, and turning on the first control module otherwise.

The embodiments of the present disclosure have advantageous effects as follows.

In the power adapter and the portable computer according to the embodiments of the present disclosure, when the portable computer is in a state having a low power consumption, the pulse width modulation unit is controlled to be in the turned-off state and the energy storage elements in the output shaping unit supply power to the portable computer with stored energy, if the output voltage of the power adapter is larger than the first preset voltage threshold; and the pulse width modulation unit is controlled to be in the operation state and the power adapter supplies power to the portable computer and also the energy storage elements so as to supply power to the portable computer by the energy storage elements with the stored energy in a next turn, if the output voltage of the power adapter is smaller than the second preset voltage threshold. Therefore, all of the switch devices in the PWM module of the power adapter are in the turned-off state when a system operates with the surplus energy stored by the energy storage elements, and the longer the period in the turned-off state is, the smaller the energy consumed is. Since the power consumption of the switch devices in a light load situation occupies most of the entire power consumption of the power adapter, the embodiment of the present disclosure can notably reduce the power consumption of the switch devices in the PWM module of the power adapter, in a light load situation, and thus can increase the efficiency of the power adapter.

In the power adapter and the portable computer according to the embodiment of the present disclosure, the power adapter is completely turned-off when the build-in power supply can support the portable computer to operate for a predetermined period, therefore the energy consumption brought by the power adapter itself as it operates is reduced when a user does not detach the power adapter.

In the power adapter and the portable computer according to the embodiment of the present disclosure, the voltage supplied to the mainboard is controlled according to the current state of the power supply of the portable computer and the energy requirement. Particularly, the voltage supplied to the mainboard is small when the portable computer is in the first state having low power consumption, and the voltage supplied to the mainboard is large when the portable computer is in the second state having low power consumption. Thus, the energy consumption is reduced as compared to a case that the existing power adapter constantly outputs a high voltage.

DETAILED DESCRIPTION

In a first embodiment of the present disclosure, a portable computer is supplied power with energy stored during normal operation by energy storage elements in an output shaping unit, in order to increase efficiency of adapter.

Figure 1:
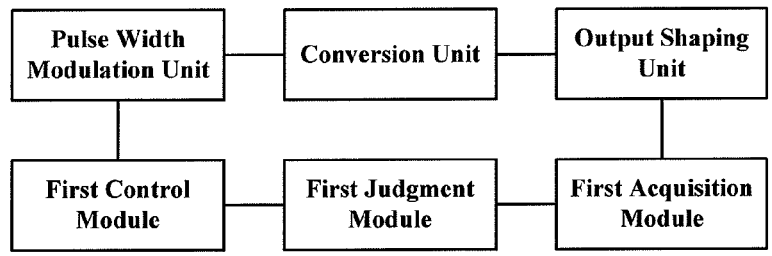
FIG. 1 is a schematic view illustrating a structure of a power adapter according to a first embodiment of the present disclosure.

As illustrated in FIG. 1, a power adapter according to the first embodiment of the present disclosure is used for supplying power to a portable computer and comprises a pulse width modulation unit and an output shaping unit whose initial states are operation states, wherein the power adapter further comprises:

a first acquisition module for acquiring an output voltage of the output shaping unit, a first judgment module for judging relationships between the output voltage and a first preset voltage threshold and a second preset voltage threshold and obtaining a judgment result, the first preset voltage threshold being larger than or equal to the second preset voltage threshold;

a first control module for controlling the pulse width modulation unit to be in a turned-off state when the judgment result indicates that the output voltage is larger than the first preset voltage threshold, and for controlling the pulse width modulation unit to be in the operation state when the judgment result indicates that the output voltage is smaller than the second preset voltage threshold.

The above-described power adapter further comprises:

a second acquisition module for acquiring a state judging parameter of the portable computer; and the first judgment module judges whether the portable computer is in a first state according to the state judging parameter, and judges the relationships between the output voltage and the first preset voltage threshold and the second preset voltage threshold and obtains the judgment result when it is judged that the portable computer is in the first state;

the first control module is particularly used to control the pulse width modulation unit to be in the turned-off state when the portable computer is in the first state and the output voltage is larger than the first preset voltage threshold, and to control the pulse width modulation unit to be in the operation state when the portable computer is in the first state and the output voltage is smaller than the second preset voltage threshold.

The first preset voltage threshold and the second preset voltage threshold may be set depending on requirements, as long as it is ensured that the first preset voltage threshold is larger than or equal to the second preset voltage threshold.

Of course, when the first preset voltage threshold is not equal to the second preset voltage threshold, the first control module is further used to maintain a state of the pulse width modulation unit being unchanged if the output voltage is between the first preset voltage threshold and the second preset voltage threshold.

Considering a power capacity of the existing portable computer and situations of energy storage elements in the output shaping unit, state having low power consumption, such as the S3, S4 and S5 state in which the power consumption is extremely low and the energy storage elements in the output shaping unit can support for a period of time, would generally be selected as the first state.

Also, with developments in manufacturing process of devices, the power consumption of the portable computer may become lower and lower or the storage capacity of the energy storage elements may become larger and larger, the above states may be changed as the S1, S2 state, or even the S0 state.

In the above-described embodiments of the present disclosure, considering a case that the most of the portable computer would use a changeable battery and, when the changeable battery is charged, a power adapter is needed to supply a voltage at which the portable computer operates in the S0 mode, therefore the power adapter should normally supply power even when the portable computer operates in a low consumption state (such as the S4, S5 state and the like). In view of this, the power adapter according to the embodiment of the present disclosure further comprises:

a third acquisition module for interacting with the portable computer so as to acquire a battery state judging parameter;

a second control module for turning off the first control module when it is judged that the chargeable power supply is in a charging state according to the battery state judging parameter, and turning on the first control module otherwise.

It can be seen from the above description, the power adapter needs to acquire two parts of parameters:

the state judging parameter; and the output voltage of the output shaping unit.

The output voltage of the output shaping unit may be obtained directly by a voltage detection element, and this process is easy for those skilled in the art.

The state judging parameter may be obtained in several ways in the above-described embodiment of the present disclosure. For example, the state judging parameter may include the parameters as follows:

state parameter of the portable computer; or current power consumption of the portable computer; or the current power consumption and duration of the portable computer.

When the state judging parameter includes the current power consumption of the portable computer, the first judgment module of the power adapter further comprises:

a first unit for comparing the current power consumption and a first threshold;

a second unit for judging a current state of the portable computer as the first state when the current power consumption is smaller than the first threshold;

wherein the first threshold is a maximum power consumption in the first state of the portable computer, or a sum of the maximum power consumption and a margin threshold.

When the state judging parameter includes the current power consumption and duration of the portable computer, the first judgment module of the power adapter further comprises:

a first unit for comparing the current power consumption and a first threshold;

a third unit for judging a current state of the portable computer as the first state when the current power consumption is smaller than the first threshold and the duration exceeds a second time threshold;

wherein the first threshold is a maximum power consumption in the first state of the portable computer, or a sum of the maximum power consumption and a margin threshold.

The respective details will be described below.

<Implementation 1>

In the Implementation 1, the state judging parameter includes the state parameter of the portable computer, and the state judging parameter may be directly acquired from the portable computer end.

In the Implementation 1, the state parameter is required to be transferred between the power adapter and the portable computer since the state parameter is directly acquired from the portable computer end, thus a PIN for transferring the state parameter is needed to be correspondingly added at the power adapter and the portable computer end.

The detailed embodiment of the present disclosure is not limited to any detailed communication mode, and any communication manner that enables the communication between an external equipment and the portable computer may be used to transfer the state parameter, therefore their details are omitted herein.

<Implementation 2>

When the state parameter is acquired from the portable computer, errors may occur during a receiving process of the data considering that electromagnetic interference in the power adapter itself is large. Therefore the state judging parameter is the current power consumption of the portable computer in the Implementation 2.

It will know that, combined with the description in the BACKGROUND, the devices being turned-off are different in each state of the S0-S5 state of the portable computer. For example, all of the devices operate in the state S0; the CPU is turned off in the state S1; only the memory operates in the state S3; and all of the devices are turned off in both state S4 and S5.

Because different devices operate in each state and thus the power consumption required to maintain devices operating are different in each state, the current power consumption of the portable computer is acquired directly and the state thereof is judged according to the current power consumption in the Implementation 2. The details will be described below.

An operation process of the power adapter will be described in details by making a case that the first state includes the S3, S4 and S5 states as an example.

A first threshold is preset as follows:

A1: a maximum value of the power consumption of the portable computer, for S3, S4 and S5 state.

When the first state is a single state, A1 is the power consumption of the portable computer in the single state.

Then the current power consumption A is acquired from the portable computer and a relationship between the A and A1 is judged. Generally, there are several relationships as follows no matter which state the portable computer is in:

A is larger than A1; or

A is smaller than or equal to A1.

Since the A1 is the maximum value of the power consumption of the portable computer, for S3, S4 and S5 state, if A is larger than A1, it indicates that the current state of the portable computer is not the S3, S4 or S5 state, otherwise it indicates that the portable computer is in the S3, S4 or S5 state currently.

Herein, those skilled in the art can understand that the first state may be other states, and accordingly the first threshold preset may correspond to the other states.

Of course, considering that the power consumption may increase due to aging of the equipments after the portable computer is used for a long time, following judging manner may be further used:

Setting the first threshold as a sum of the maximum power consumption A1 of the portable computer in the first state and a margin threshold $\Delta$;

judging the relationship between the current power consumption A of the portable computer and A1+$\Delta$, and there are generally several relationships as follows no matter which state the portable computer is in:

A is larger than A1+$\Delta$; or

A is smaller than or equal to A1+$\Delta$.

Since the A1 is the maximum value of the power consumption of the portable computer, for S3, S4 and S5 state, if A is larger than A1+$\Delta$, it indicates that the current state of the portable computer is not the S3, S4 or S5 state, otherwise it indicates that the portable computer is in the S3, S4 or S5 state currently.

<Implementation 3>

The state parameter is acquired directly from the portable computer in the Implementation 1, so errors may occur during the receiving process of the data considering that electromagnetic interference in the power adapter itself is large. The judgment is made according to the current power consumption of the portable computer in the Implementation 2, but a power consumption jump problem of the portable computer due to external factors is not taken into account. Therefore, the state judging parameter includes the current power consumption and duration of the portable computer in the Implementation 3.

It will know that, combined with the description in the BACKGROUND, the devices being turned-off are different in each state of the S0-S5 state of the portable computer. For example, all of the devices operate in the state S0; the CPU is turned off in the state S1; only the memory operates in the state S3; and all of the devices are turned off in both state S4 and S5.

Because different devices operate in each state and thus the power consumption required to maintain devices operating are different in each state, the current power consumption of the portable computer is acquired directly and the state thereof is judged according to the current power consumption and the duration in the Implementation 3. The details will be described below.

A first threshold is preset as follows:

A1: a maximum value of the power consumption of the portable computer, for S3, S4 and S5 state.

Then the current power consumption A is acquired from the portable computer and a relationship between the A and A1 is judged. Generally, there are several relationships as follows no matter which state the portable computer is in:

A is larger than A1, and the duration exceeds a first time threshold T1; or

A is smaller than or equal to A1, and the duration exceeds a second time threshold T2; or A is larger than A1, and the duration does not exceed the first time threshold T1; or A is smaller than or equal to A1, and the duration does not exceed the second time threshold T2.

Since the A1 is the maximum value of the power consumption of the portable computer, for S3, S4 and S5 state, if A is larger than A1, it indicates that the current state of the portable computer is not the S3, S4 or S5 state, otherwise it indicates that the portable computer is in the S3, S4 or S5 state currently.

Also, it indicates that no power consumption jump due to the external factors exists if the duration exceeds the first time threshold T1 or the second time threshold T2. And it indicates that power consumption jump due to the external factors maybe exist if the duration does not exceed the first time threshold T1 or the second time threshold T2.

With respect to the Implementation 2, a factor of duration is added so as to avoid the problem of misjudgment result from the power consumption jump of the portable computer due to the external factors.

Of course, based on the same reason, considering that the power consumption may increase due to aging of the equipments after the portable computer is used for a long time, following judging manner may be further used.

Judging the relationship between the current power consumption A of the portable computer and A1 (the first threshold)+A (the margin threshold), and there are generally several relationships as follows no matter which state the portable computer is in:

A is larger than A1+A, and the duration exceeds a first time threshold T1; or

A is smaller than or equal to A1+A, and the duration exceeds a second time threshold T2; or A is larger than A1+Δ, and the duration does not exceed the first time threshold T1; or A is smaller than or equal to A1+A, and the duration does not exceed the second time threshold T2.

Of course the T1 and T2 may be set as the same time value or different time value.

In the above-described embodiments of the present disclosure, the current power consumption of the portable computer may be acquired by following manners which would be described later.

The power adapter further comprises a resistance element disposed on an output channel of the output shaping unit.

The second acquisition module further comprises:

a current detection element for detecting the current of the resistance element;

a voltage detection element for detecting the output voltage of the output shaping unit;

wherein the current power consumption of the portable computer is a product of the current of the resistance element and the output voltage of the output shaping unit.

Or, a resistor may be connected to the output terminal of the power adapter in series, thus a current of the resistor and a current output voltage of the power adapter may be detected to obtain the current power consumption of the portable computer by multiplying the current and the current output voltage.

Of course, since a resistor is generally connected to a Direct Current input terminal of the portable computer in series, the current power consumption of the portable computer also can be obtained by detecting a current and a voltage of the resistor and calculating the current power consumption of the portable computer by using the detected current and voltage. Then, the calculated current power consumption may be transferred to the power adapter by the portable computer via a data channel.

In the above-described embodiment of the present disclosure, the first control module may control the pulse width modulation unit to be in the turned-off state or the turned-on state (operation state) by many manners, and the details are described as follows.

<Manner 1>

A Direct Control Manner.

In the Manner 1, the first control module directly controls whether the pulse width modulation unit would operate or not.

<Manner 2>

A Path Control Manner.

In the Manner 2, whether the pulse width modulation unit would operate or not is controlled indirectly by controlling an electrical loop of the pulse width modulation unit, the details are described as follows.

In the power adapter, a first switch which is in a turned-on state initially is further disposed in the power adapter, the first control module is connected with the first switch and is used to cause the pulse width modulation unit being in the turned-off state or the operation state by controlling the first switch to be turned off or on, respectively.

Generally, the power adapter comprises:

A mains plug, an anti-electromagnetic interference filtering unit, an input shaping unit, a conversion unit and an output shaping unit which are connected sequentially, the input shaping unit is connected to the conversion unit through a starting circuit and the pulse width modulation unit, and the pulse width modulation unit is in turn connected to an output terminal of the output shaping unit and a reference voltage control unit through an optical coupling unit.

Figure 2:
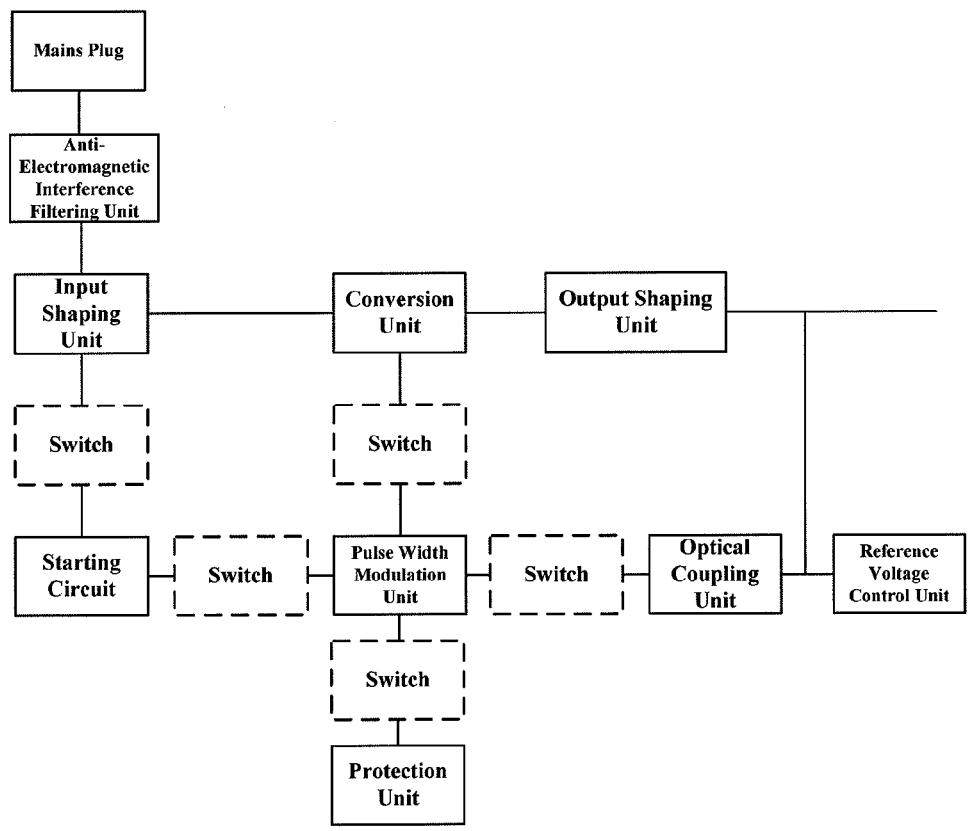
FIG. 2 is a schematic view illustrating a detailed structure of the power adapter according to the first embodiment of the present disclosure.

FIG. 2 is a schematic view illustrating the possible position of the switch. The switch may be disposed at any position indicated by dashed boxes in FIG. 2, and of course the switch may be disposed at other position which is not illustrated in the figure.

It can be seen from FIG. 2, no matter which position in FIG. 2 the switch is at, either the pulse width modulation unit can not obtain a correct input signal or can not output signal, as long as the switch is turned off, thus the pulse width modulation unit cannot operate normally and is in the turned-off state accordingly; once the switch is turned on, the pulse width modulation unit is in the operation state, just as the general power adapter.

It can be seen from FIG. 2, the optical coupling unit is disposed to insulate a primary end from a secondary end so as to eliminate potential security hazards.

Figure 3:
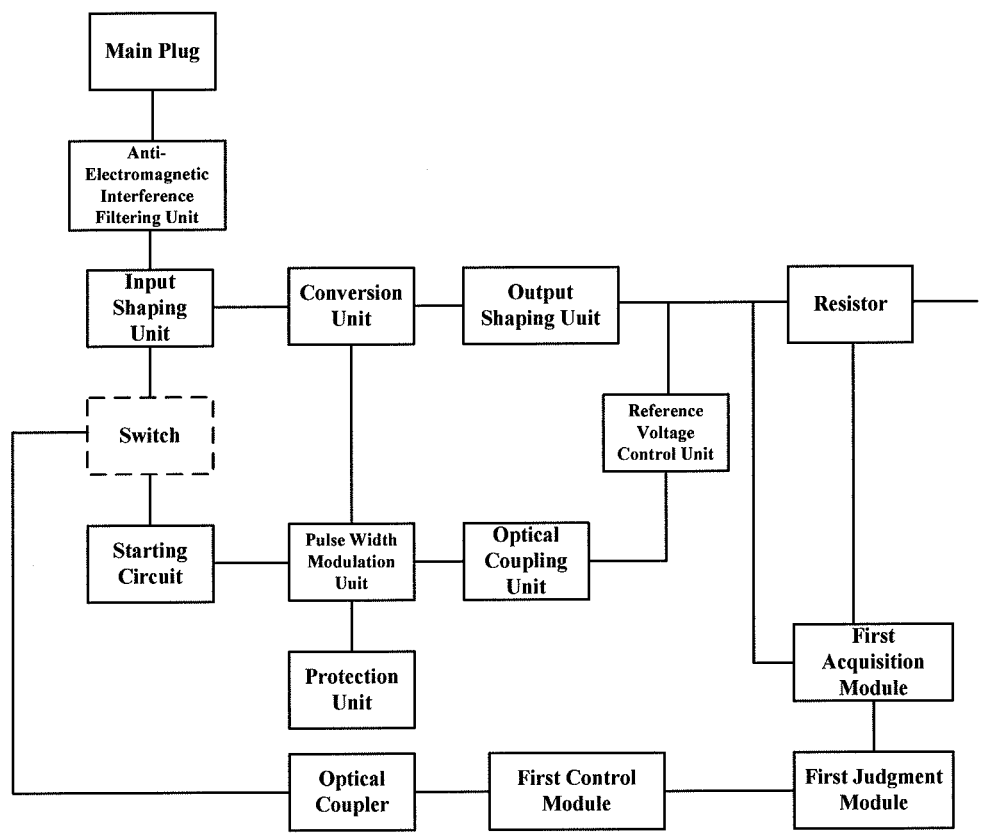
FIG. 3 is a schematic view illustrating a detailed structure of the power adapter, when the power adapter implements the power consumption at the adapter side, according to the first embodiment of the present disclosure.

FIG. 3 is a schematic view illustrating a detailed structure of the power adapter according to the first embodiment of the present disclosure, wherein a resistor is connected to the output terminal of the power adapter in series, the first acquisition module detects a current of the resistor and a current output voltage of the output shaping unit, and then the current power consumption of the portable computer is obtained by multiplying the current by the output voltage.

Particularly, the first judgment unit judges the state that the portable computer is in currently by comparing the current power consumption with a power consumption threshold, and further judges a relationship between the output voltage and a first preset voltage threshold and a second preset voltage threshold and obtains a judgment result when it is judged that the portable computer is in the first state; wherein the first preset voltage threshold is larger than the second preset voltage threshold.

Further, the first control module controls the switch to be in a turned-off state when the judgment result indicates that the output voltage is larger than the first preset voltage threshold, and controls the switch to be in a turned-on state when the judgment result indicates that the output voltage is smaller than the second preset voltage threshold.

If the portable computer has been in such state for a long time, it indicates that a user has not use the portable computer for a long time. At this time, in order to save power, both the portable computer and the power adapter should be shut off. Therefore, the power adapter may further comprises:

a duration monitoring module for monitoring a duration during which the portable computer is in the first state when the first judgment module judges that the portable computer is in the first state according to the state judging parameter; and a third control module for controlling the first control module to be turned off and controlling the first switch to be turned off, when the duration during which the portable computer is in the first state exceeds a first preset period.

At this time, the first control module would not function, and the power adapter does not supply power to the portable computer any longer because the switch is turned off, so that no power will be consumed wastefully even when the user does not use the portable computer for a long time.

Considering data security, the power adapter may further comprises:

a notification module for transmitting a close instruction to the portable computer in order to make the portable computer be powered-off when the duration during which the portable computer is in the first state exceeds a second preset period.

Of course, instead of disposing the notification module, the power adapter and the portable computer may make an agreement in advance with each other to operate synchronously if the duration during which the portable computer is in the first state exceeds a preset period, that is, the first preset period is set as being equal to the second preset period. Thus, the portable computer may be shut down after storing data and the power adapter may turn off the switch.

As described above, the energy stored in the output shaping unit can support the portable computer to operate for a short time after the power adapter turns off the switch, so it is enough for the portable computer to complete a shutdown process.

Thereafter the operation process of the adapter illustrated in FIG. 3 will be described in detailed.

When the portable computer is in the operation state, the second acquisition module acquires the current and the voltage, the first judgment module obtains the current power consumption of the portable computer and judges that the portable computer is not in the S3, S4 or S5 state, therefore the first judgment module would not further judge the relationship between the current output voltage and the preset voltage threshold, thus the first control module would not be triggered. The switch is in the turned-on state at this time, the power adapter is as same as a general power adapter.

If the user leaves the portable computer for a period of time and the portable computer enters a stand-by state, the first judgment module obtains the current power consumption of the portable computer according to the current and voltage acquired by the second acquisition module, and if the first judgment module finds that the current power consumption is lower than a power consumption threshold, it judges that the portable computer is not in the S3 state, then it would further judge the relationships between the output voltage of the output shaping unit and the first preset voltage threshold and the second preset voltage threshold so as to obtain the judgment result.

Since the output shaping unit is in the normal operation state therebefore and its output voltage is high, the judgment result would indicate that the output voltage is larger than the first preset voltage, so that the first control module would control the switch to be turned off.

After the switch is turned off, the energy storage elements in the output shaping unit supply power to the portable computer by releasing the energy stored therein. As the energy is continually consumed, the output voltage decreases continually. After the output voltage decreases to be below the second preset voltage threshold, the first judgment module may judge that the output voltage is smaller than the second preset voltage threshold. At this time, the first control module may control the switch to be turned on.

After the switch is turned on, the power adapter supplies power in a normal manner. Therefore, the output voltage may increase to the first preset voltage threshold or even exceed the first preset voltage threshold in a very short period of time, while the energy storage elements complete the storage of the energy. Because the output voltage increases to the first preset voltage threshold or even exceeds the first preset voltage threshold, the judgment result would indicate that the output voltage is larger than the first preset voltage threshold, thus the first control module may control the switch to be turned off.

After the switch is turned off, the energy storage elements in the output shaping unit supply power to the portable computer by releasing the energy stored therein too, and the voltage decreases. When the voltage decreases for a certain degree, the first control module would control the switch to be turned on.

The above-described process is repeated, so that the energy in the energy storage elements can be utilized efficiently, which can increase the efficiency of the power adapter.

After the portable computer enters the operation state, that is, the S0 state, from the S3 state, the first judgment module obtains the current power consumption of the portable computer according to the current and voltage acquired by the second acquisition module, and judges that the portable computer is not in the S3 state, therefore the switch may be maintained being turned on and the first control module may not be triggered.

Of course, the above description makes the operation states S0 and S3 as examples and such explanation may be applied to other states, their details are omitted herein.

When the power adapter according to the first embodiment of the present disclosure operates, the switch device therein (mainly the switch device in the PWM module) is in a power consuming state. The power consumed by the portable computer is not high when the portable computer is in a light load situation, so the power consumed by the switch device in the power adapter occupies a dominant position. However, in the power adapter according to the first embodiment of the present disclosure, when the portable computer is in a state having a low power consumption, the pulse width modulation unit is controlled to be in the turned-off state and the energy storage elements in the output shaping unit supply power to the portable computer with stored energy, if the output voltage of the power adapter is larger than the first preset voltage threshold; and the pulse width modulation unit is controlled to be in the operation state and the power adapter supplies power to the portable computer and also the energy storage elements so as to supply power to the portable computer by the energy storage elements with the stored energy in a next turn, if the output voltage of the power adapter is smaller than the second preset voltage threshold. Therefore, all of the switch devices in the PWM module of the power adapter are in the turned-off state when a system operates with the surplus energy stored by the energy storage elements, and the longer the period in the turned-off state is, the smaller the energy consumed is. Since the power consumption of the switch devices in a light load situation occupies most of the entire power consumption of the power adapter, the embodiment of the present disclosure can notably reduce the power consumption of the switch devices in the PWM module of the power adapter, in a light load situation, and thus can increase the efficiency of the power adapter.

It is noted that none of the existing portable computer takes a problem concerning the power consumption in the power adapter into account. When the user does not use an external power supply, he/she generally only detaches the output terminal of the power adapter from the portable computer. However, only detaching the output terminal of the power adapter from the portable computer is not conducive to the power saving, because the power adapter is still in a state that consumes power.

In a second embodiment of the present disclosure, the power adapter is completely turned-off when a build-in power supply can support the portable computer to operate for a predetermined period according to the state that the portable computer is in currently, so as to reduce the energy consumption.

Figure 4:
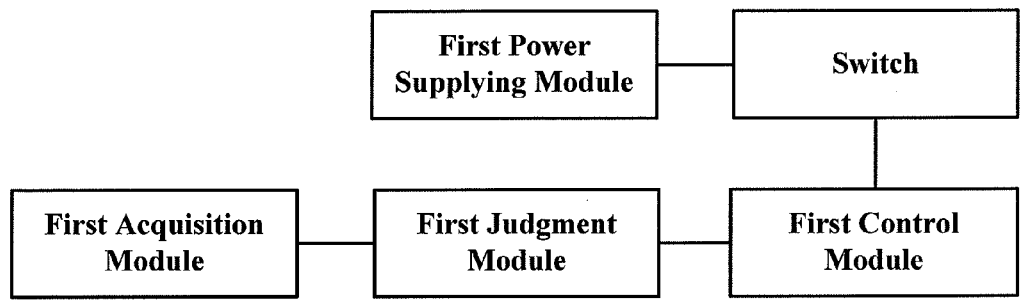
FIG. 4 is a schematic view illustrating a structure of a power adapter according to a second embodiment of the present disclosure.

The function of the power adapter according to the second embodiment of the present disclosure can be used alone, as illustrated in FIG. 4, a power adapter according to the second embodiment of the present disclosure is used for supplying power to a portable computer in which a build-in power supply is disposed, wherein the power adapter comprises:

a first power supplying module for supplying power to the portable computer;

a switch disposed in a power supplying loop of the first power supplying module and being in a turned-on state initially;

a first acquisition module for acquiring a switch control parameter;

a first judgment module for judging whether the build-in power supply can support the portable computer to operate in a current state for a first preset period according to the switch control parameter;

a first control module for controlling the switch to be turned off when the build-in power supply can support the portable computer to operate in the current state for the first preset period, and controlling the switch to be turned on otherwise.

Further, the function of the power adapter according to the second embodiment of the present disclosure may be used combined with the function of the power adapter according to the first embodiment of the present disclosure, that is, the power adapter is completely turned-off when a build-in power supply can support the portable computer to operate for a predetermined period according to the state that the portable computer is in currently, so as to reduce the energy consumption, while the energy storage elements supply power to the portable computer with energy stored during the normal operation process so as to increase the efficiency of the power adapter.

As applying the function of the power adapter according to the second embodiment of the present disclosure to the power adapter according to the first embodiment of the present disclosure, the power adapter according to the second embodiment of the present disclosure is used for supplying power to a portable computer in which a build-in power supply is disposed, wherein the power adapter further comprises:

a first power supplying module for supplying power to the portable computer;

a second switch which is disposed on a power supplying loop of the first power supplying module and is in a turned-on state initially;

a fourth acquisition module for acquiring a switch control parameter of the second switch;

a second judgment module for judging whether the build-in power supply can support the portable computer to operate in the current state for a third preset period according to the switch control parameter;

a fourth control module for controlling the second switch to be turned off when the build-in power supply can support the portable computer to operate in the current state for the third preset period, and controlling the second switch to be turned on otherwise.

Herein, those skilled in the art can understand that the above-described power adapters comprise the same components in fact, although the same components are expressed differently from the literal when the power adapter according to the second embodiment of the present disclosure is used separately and when it is combined with the function of the power adapter according to the first embodiment of the present disclosure. For example, the switch and the second switch, the first acquisition module and the fourth acquisition module, the first judgment module and the second judgment module, and the first control module and the fourth control module. The embodiment of the present disclosure is not so limited.

Further, those skilled in the art also can understand that the same name may be used to express different elements in different embodiments. For example, the first acquisition module, the first judgment module and the first control module are included in both the power adapter according to the first embodiment of the present disclosure and the power adapter according to the second embodiment of the present disclosure, but the above components should not be constructed as the same components, because they perform different functions in different embodiments. The embodiment of the present disclosure is not so limited.

The following description is based on a case that the function of the power adapter according to the second embodiment of the present disclosure is applied to the power adapter according to the first embodiment of the present disclosure.

In the second embodiment of the present disclosure, the build-in power supply may be various types of battery, such as a button cell battery, a chargeable battery of a notebook computer, a solar battery of the notebook computer, etc.

The third preset time may be set according to the requirement of the user, such as 3 hours, or may be any longer or shorter period.

Of course, considering a power capacity of the existing portable computer and the manufacturing process of the battery, those state having low power consumption, such as the S3, S4 and S5 state in which the power consumption is extremely low and the build-in power supply can supply power, may be selected as the suitable state in the second embodiment of the present disclosure. In these states, it is not necessary for the power adapter to supply power and would not bring any consumption of the power adapter itself due to the operation of the power adapter.

Also, with developments in manufacturing process of devices, the power consumption of device may become lower and lower or the storage capacity of the battery may become larger and larger, the above states may be changed as the S1, S2 state, or even the S0 state.

In above cases, the switch control parameter includes a first parameter and a second parameter. The second judgment module is used to judge whether the current state of the portable computer is a second state in which the power consumption of the portable computer is lower than a preset value, according to the first parameter and the second parameter, and to judge whether the build-in power supply can support the portable computer to operate in the current state for the third preset period when it is judged that the portable computer is in the second state; the fourth control module is used to control the second switch to be turned off when the current state of the portable computer is the second state and the build-in power supply can support the portable computer to operate in the current state for the third preset period, and controlling the second switch to be turned on otherwise.

The above-described second parameter may include battery volume information. After obtaining the current state of the portable computer, it may be judged whether the build-in power supply can support the portable computer to operate in the current state for the third preset period according to the battery volume information of the build-in power supply, because the power consumption of the portable computer in a certain state is known.

The battery volume information can be provided only by the portable computer, therefore a PIN for transferring the state parameter is needed to be correspondingly added at the power adapter and the portable computer end. At this time, a PIN is needed to be added in a basis of the existing power adapter for transferring the state parameter. The second embodiment of the present disclosure is not limited to any detailed communication mode, and any communication manner that enables the communication between an external equipment and the portable computer may be used to transfer the state parameter, therefore their details are omitted herein.

The second control module is used for controlling the second switch to be turned off when the state of the portable computer is the second state and the build-in power supply can support the portable computer to operate in the current state for the third preset period, and controlling the second switch to be turned on otherwise.

Of course, in the second embodiment of the present disclosure, considering that most of the portable computer may use the chargeable battery and if the chargeable battery is charged, the power adapter is needed to supply a voltage at which the portable computer operates in the S0 mode, the output voltage of the power supplying module would not be decreased even if the portable computer operates in the state having low power consumption (such as S4, S5 state and the like). In view of this, the power adapter according to the second embodiment of the present disclosure further comprises:

a fifth acquisition module for interacting with the portable computer so as to acquire a battery state judging parameter;

a fifth control module for turning off the fourth control module when it is judged that the chargeable power supply is in a charging state according to the battery state judging parameter, and turning on the fourth control module otherwise.

It can be seen from the above description, two parts of the parameter are needed to be acquired, wherein one part is used to judge the current state of the portable computer, and the other part is used to judge whether the build-in power supply can support the portable computer to operate in the current state for the third preset period. Thus, the battery volume information of the build-in power supply is necessary and the battery volume information only can be provided by the portable computer.

But the current state of the portable computer may be acquired by many manners, such as:
state parameter of the portable computer; or
current power consumption of the portable computer; or
the current power consumption and duration of the portable computer.

When the first parameter is the current power consumption of the portable computer, the second judgment module of the power adapter comprises:

a fourth unit for comparing the current power consumption and a second threshold;

a fifth unit for judging the current state of the portable computer as the second state when the current power consumption is smaller than the second threshold;

wherein the second threshold is a maximum power consumption in the second state of the portable computer, or a sum of the maximum power consumption and a margin threshold.

When the first parameter includes the current power consumption and duration of the portable computer, the second judgment module of the power adapter comprises:

a fourth unit for comparing the current power consumption and a second threshold;

a sixth unit for judging the current state of the portable computer as the second state when the current power consumption is smaller than the second threshold and the duration exceeds a fourth time threshold;

wherein the second threshold is a maximum power consumption in the second state of the portable computer, or a sum of the maximum power consumption and a margin threshold.

Below will describe the details respectively.

In the second embodiment of the present disclosure, the second state may be a single state or a set of a plurality of states.

<Implementation 1>

In the Implementation 1, the first parameter includes the state parameter of the portable computer.

Thereafter, the operation process of the power adapter will be described in detailed by making a case that the second state includes the S3, S4 and S5 states as an example.

The power adapter is connected to the portable computer so as to acquire the state parameter from the portable computer end directly.

In the above implementation, the state parameter is needed to be transferred between the power adapter and the portable computer, so a PIN for transferring the data is correspondingly added at the power adapter and the portable computer end in the Implementation 1.

The detailed embodiment of the present disclosure is not limited to any detailed communication mode, and any communication manner that enables the communication between an external equipment and the portable computer may be used to transfer the state parameter, therefore their details are omitted herein.

<Implementation 2>

When the state parameter is acquired from the portable computer directly, errors may occur during a receiving process of the data considering that electromagnetic interference in the power adapter itself is large. Therefore the first parameter includes the current power consumption of the portable computer in the Implementation 2.

It will know that, combined with the description in the BACKGROUND, the devices being turned-off are different in each state of the S0-S5 states of the portable computer. For example, all of the devices operate in the state S0; the CPU is turned off in the state S1; only the memory operates in the state S3; and all of the devices are turned off in both state S4 and S5.

Because different devices operate in each state and thus the power consumption required to maintain devices operating are different in each state, the current power consumption of the portable computer is acquired directly and the state thereof is judged according to the current power consumption in the Implementation 2. The details will be described below.

An operation process of the power adapter will be described in details making a case that the second state includes the S3, S4 and S5 state as an example.

A second threshold is preset as follows:

A2: a maximum value of the power consumption of the portable computer, for S3, S4 and S5 state.

When the second state is a single state, A2 is the power consumption of the portable computer in the single state.

Then the current power consumption A is acquired from the portable computer and a relationship between the A and A2 is judged. Generally, there are several relationships as follows no matter which state the portable computer is in:

A is larger than A2; or

A is smaller than or equal to A2.

If A is larger than A2, it indicates that the current state of the portable computer is not the S3, S4 or S5 state, otherwise it indicates that the portable computer is in the S3, S4 or S5 state currently, because the A2 is the maximum value of the power consumption of the portable computer, for S3, S4 and S5 state.

Of course, considering that the power consumption may increase due to aging of the equipments after the portable computer is used for a long time, following judging manner may be further used.

Judging the relationship between the current power consumption A of the portable computer and A2+Δ (a margin threshold), and there are generally several relationships as follows no matter which state the portable computer is in:

A is larger than A2+Δ; or

A is smaller than or equal to A2+Δ.

If A is larger than A2+Δ, it indicates that the current state of the portable computer is not the S3, S4 or S5 state, otherwise it indicates that the portable computer is in the S3, S4 or S5 state currently, because the A2 is the maximum value of the power consumption of the portable computer, for S3, S4 and S5 state.

<Implementation 3>

The state parameter is acquired directly from the portable computer in the Implementation 1, so errors may occur during the receiving process of the data considering that electromagnetic interference in the power adapter itself is large. The judgment is made according to the current power consumption of the portable computer in the Implementation 2, but a power consumption jump problem of the portable computer due to external factors is not taken into account. Therefore, the first parameter includes the current power consumption and duration of the portable computer in the Implementation 3.

It will know that, combined with the description in the BACKGROUND, the devices being turned-off are different in each state of the S0-S5 states of the portable computer. For example, all of the devices operate in the state S0; the CPU is turned off in the state S1; only the memory operates in the state S3; and all of the devices are turned off in both state S4 and S5.

Because different devices operate in each state and thus the power consumption required to maintain devices operating are different in each state, the current power consumption of the portable computer is acquired directly and the state thereof is judged according to the current power consumption and the duration in the Implementation 3. The details will be described below.

A second threshold is preset as follows:

A2: a maximum value of the power consumption of the portable computer, for S3, S4 and S5 state.

Then the current power consumption A is acquired from the portable computer and a relationship between the A and A2 is judged. Generally, there are several relationships as follows no matter which state the portable computer is in:

A is larger than A2, and the duration exceeds a third time threshold T3; or

A is smaller than or equal to A2, and the duration exceeds a fourth time threshold T4; or A is larger than A2, and the duration does not exceed the third time threshold T3; or A is smaller than or equal to A2, and the duration does not exceed the fourth time threshold T4.

If A is larger than A2, it indicates that the current state of the portable computer is not the S3, S4 or S5 state, otherwise it indicates that the portable computer is in the S3, S4 or S5 state currently, because the A2 is the maximum value of the power consumption of the portable computer, for S3, S4 and S5 state.

Also, it indicates that no power consumption jump due to the external factors exists if the duration exceeds the third time threshold T3 or the fourth time threshold T4. And it indicates that power consumption jump due to the external factors maybe exist if the duration does not exceed the third time threshold T3 or the fourth time threshold T4.

With respect to the Implementation 2, a factor of duration is added so as to avoid the problem of misjudgment result from the power consumption jump of the portable computer due to the external factors.

Of course, based on the same reason, considering that the power consumption may increase due to aging of the equipments after the portable computer is used for a long time, following judging manner may be further used.

Judging the relationship between the current power consumption A of the portable computer and A2+Δ (the margin threshold), and there are generally several relationships as follows no matter which state the portable computer is in:

A is larger than A2-Δ, and the duration exceeds the third time threshold T3; or

A is smaller than or equal to A2+Δ, and the duration exceeds the fourth time threshold T4; or A is larger than A2+Δ, and the duration does not exceed the third time threshold T3; or A is smaller than or equal to A2+Δ, and the duration does not exceed the fourth time threshold T4.

Of course the T3 and T4 may be set as the same time value or different time value.

Herein, those skilled in the art can understand that the second state may be other states except for the S3, S4 or S5 states, and accordingly correspond to different power consumption thresholds.

In the above-described embodiments of the present disclosure, the current power consumption of the portable computer may be acquired by following manners which would be described later.

The power adapter further comprises a resistance element disposed on an output channel of the output shaping unit.

The fourth acquisition module further comprises:

a current detection element for detecting the current of the resistance element;

a voltage detection element for detecting the output voltage of the output shaping unit;

wherein the current power consumption of the portable computer is a product of the current of the resistance element and the output voltage of the output shaping unit.

Or, a resistor may be connected to the output terminal of the power adapter in series, thus a current of the resistor and a current output voltage of the power adapter may be detected to obtain the current power consumption of the portable computer by multiplying the current and the output voltage.

Of course, since a resistor is generally connected to a Direct Current input terminal of the portable computer in series, the current power consumption of the portable computer also can be obtained by detecting a current and a voltage of the resistor and calculating the current power consumption of the portable computer by using the detected current and voltage. Then, the calculated current power consumption may be transferred to the power adapter by the portable computer via a data channel.

In the detailed embodiment of the present disclosure, the position of the second switch could be disposed in many manners.

Figure 5:
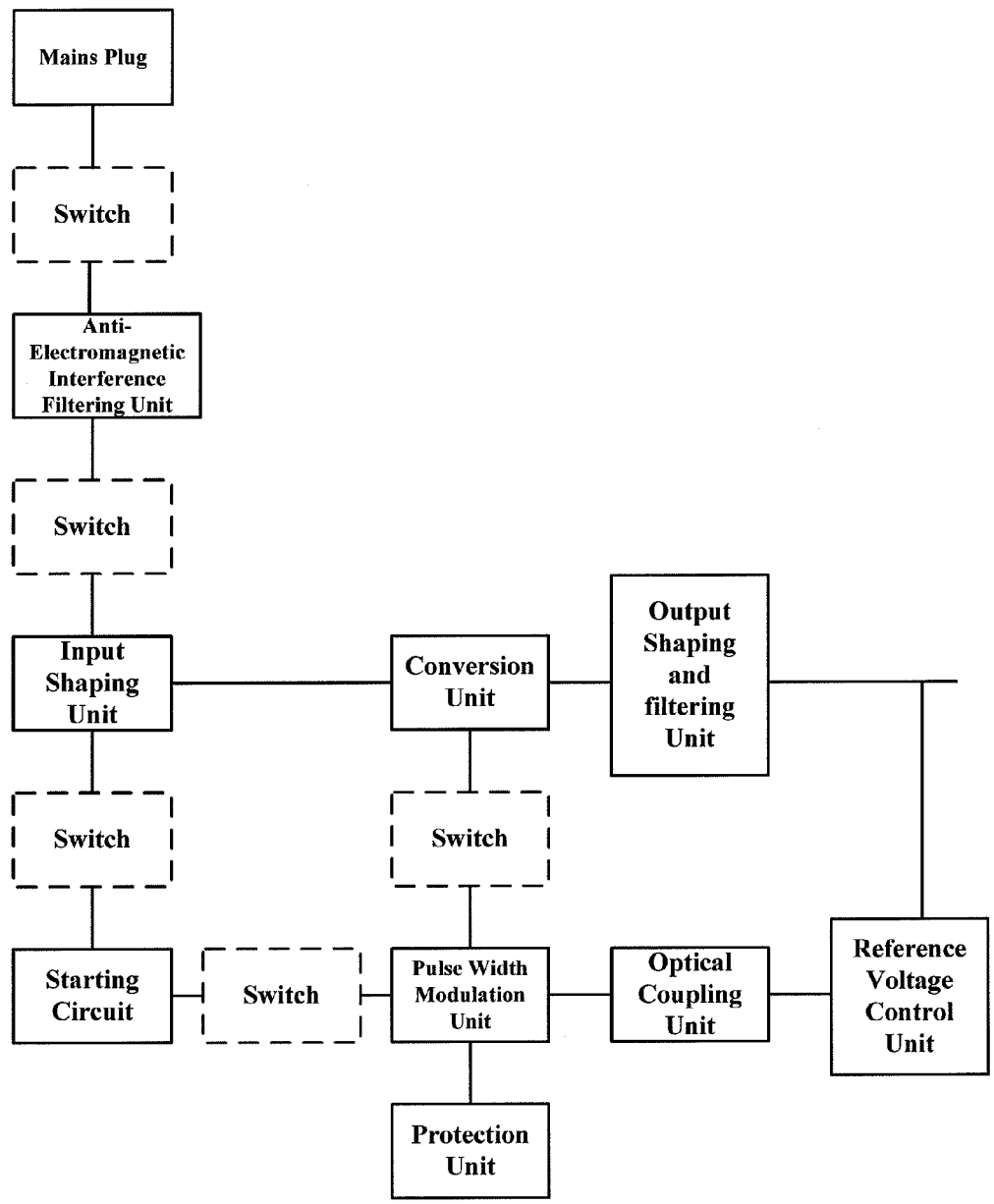
FIG. 5 is a schematic view illustrating a detailed structure of the power adapter according to the second embodiment of the present disclosure.

FIG. 5 is a schematic view illustrating a structure of the general power adapter, wherein the dashed boxes expresses possible positions at which the switch may be disposed. In fact, the switch may be disposed at any suitable position as long as it is located between the conversion unit and the mains plug.

Figure 6:
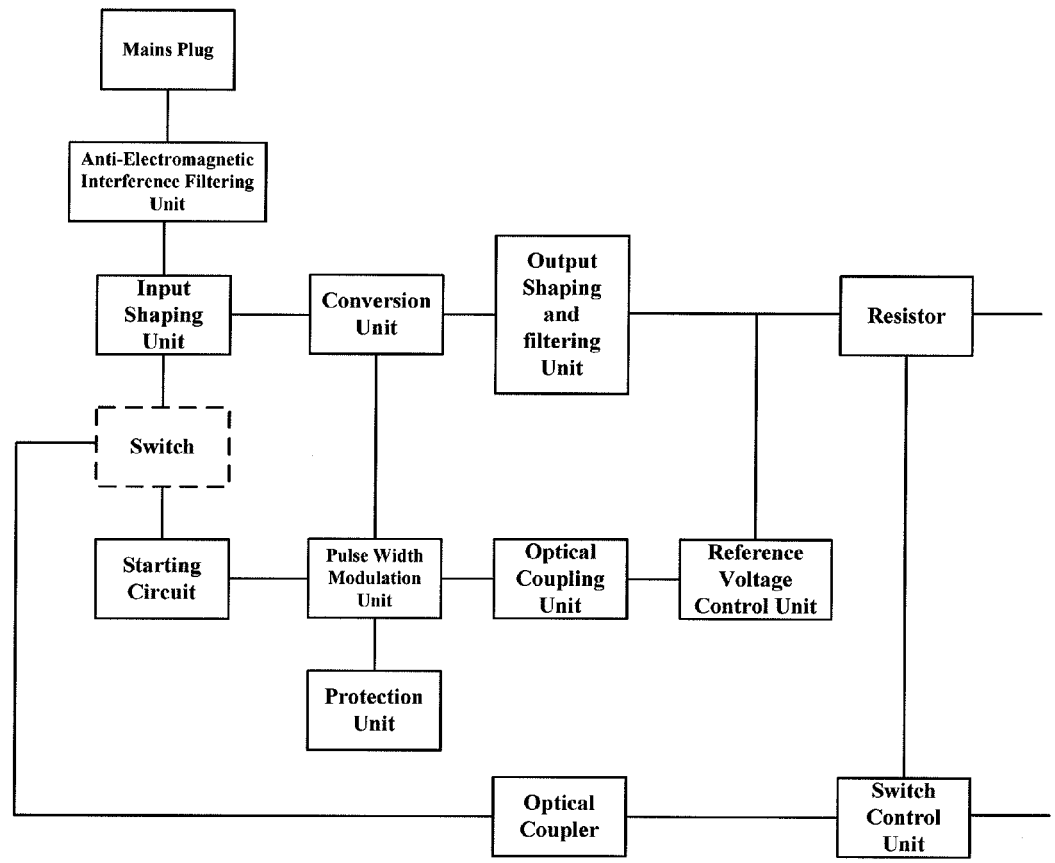
FIG. 6 is a schematic view illustrating a detailed structure of the power adapter, when the power adapter implements the power consumption at the adapter side, according to the second embodiment of the present disclosure.

FIG. 6 is a schematic view illustrating a detailed structure of the power adapter according to the second embodiment of the present disclosure, wherein a resistor is connected to the output terminal of the power adapter in series, a switch control unit detects a current of the resistor and a current output voltage of the power adapter, and then the current power consumption of the portable computer is obtained by multiplying the current by the output voltage.

At the same time, the switch control unit acquires the battery volume information of the build-in power supply via a data channel to the portable computer, and judges whether the build-in power supply can support the portable computer to operate in the current state for the third preset period after acquiring the current power consumption of the portable computer and the battery volume information of the build-in power supply. If yes, the second switch is controlled to be turned off through an optical coupler, and the second switch is controlled to be turned on through the optical coupler otherwise.

An example of the operation process of the above power adapter will be described in details thereafter.

If the user leaves the portable computer for a period of time and the portable computer enters the stand-by state S2 (the battery volume of the build-in power supply is enough at this time), the power adapter may obtain the current power consumption of the portable computer by detecting the current of the resistor and the current output voltage of the power adapter and multiplying them, and find that the portable computer enters the stand-by state S2. Also, the power adapter may find that the build-in power supply can support the portable computer to operate in the current state for the third preset period after receiving the battery volume information of the build-in power supply transmitted from the portable computer via the data channel, and control the second switch to be turned off, so that the portable computer is supplied power by the build-in power supply.

After the user returns and starts up the portable computer, the portable computer enters the operation state S0. The power adapter may obtain the current power consumption of the portable computer by detecting the current of the resistor and the current output voltage of the power adapter and multiplying them, and find that the portable computer enters the operation state S0. Also, the power adapter may find that the build-in power supply cannot support the portable computer to operate in the current state for the third preset period after receiving the battery volume information of the build-in power supply transmitted from the portable computer via the data channel, and control the second switch to be turned on, so that the portable computer is supplied power by the power adapter.

If the user goes out for lunch at noon, the portable computer enters the stand-by state S2. Then the switch is controlled to be turned off too and the portable computer is supplied power by the build-in power supply. After the user comes back, the portable computer enters the operation state S0. Then the power adapter may control the switch to be turned on and the portable computer is supplied power by the power adapter.

This process is repeated, so that the electronic loop of the power adapter can be disconnected without detaching the power adapter by the user, which contributes to power saving and simplifies the operations of the user.

Obviously, the above description makes the operation state S0 and the stand-by state S2 as the example, this process may also be applied to other states and their details are omitted herein.

In the second embodiment of the present disclosure, the power adapter is completely turned-off when the build-in power supply can support the portable computer to operate for a predetermined period, therefore the energy consumption brought by the power adapter itself as it operates is reduced when the user does not detach the power adapter.

Further, with a continual enhancement in requirements of various power saving standards, most of the existing portable computer and the external power supply thereof fail to comply with the new generation standard under the existing art. In particular, the problem obviously lies in that the power consumption of the portable computer is high when it is supplied power by the external power supply and is in the state having low load (such as in the S3, S4 and S5 states).

In a third embodiment of the present disclosure, the output voltage of the power adapter is controlled according to the current state of the power supply of the portable computer and the energy requirement of the portable computer, in order to reduce the power consumption.

Figure 7:
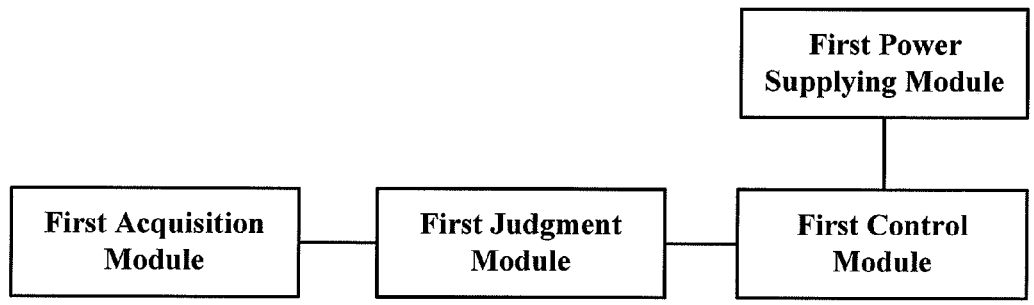
FIG. 7 is a schematic view illustrating a structure of a power adapter according to a third embodiment of the present disclosure.

When the power adapter according to the third embodiment of the present disclosure is used alone, as illustrated in FIG. 7, the power adapter according to the third embodiment of the present disclosure is used for supplying power to the portable computer, wherein the power adapter comprises:

a first power supplying module for supplying power to the portable computer;

a first acquisition module for acquiring a mode judging parameter;

a first judgment module for judging a current state of the portable computer according to the mode judging parameter;

a first control module for controlling an output voltage of the first power supplying module according to the current state of the portable computer, so that the voltage output by the first power supplying module when the current state of the portable computer is a first state is larger than the voltage output by the first power supplying module when the current state of the portable computer is a second state;

wherein a power consumption in the first state of the portable computer is larger than that in the second state of the portable computer.

Further, the function of the power adapter according to the third embodiment of the present disclosure may be used by combining the function of the power adapter according to the first embodiment of the present disclosure. That is, the output voltage of the power adapter is controlled according to the current state of the power supply of the portable computer and the energy requirement of the portable computer in order to reduce the power consumption, while the energy storage elements in the output shaping unit supply power to the portable computer with energy stored during the normal operation process so as to increase the efficiency of the power adapter.

When the function of the power adapter according to the third embodiment of the present disclosure is applied to the power adapter according to the first embodiment of the present disclosure, the power adapter according to the third embodiment of the present disclosure is used to supply power to the portable computer, wherein the power adapter further comprises:

a second power supplying module;

a sixth acquisition module for acquiring a mode judging parameter;

a third judgment module for judging a current state of the portable computer according to the mode judging parameter;

a six control module for controlling an output voltage of the second power supplying module according to the current state of the portable computer, so that the voltage output by the second power supplying module when the current state of the portable computer is a third state is larger than the voltage output by the second power supplying module when the current state of the portable computer is a fourth state;

wherein a power consumption in the third state of the portable computer is larger than that in the fourth state of the portable computer.

Herein, those skilled in the art can understand that the above-described power adapters comprise the same components in fact, although the same components are expressed differently from the literal when the power adapter according to the third embodiment of the present disclosure is used separately and when it is combined with the function of the power adapter according to the first embodiment of the present disclosure. For example, the first power supply module and the second power supply module, the first acquisition module and the sixth acquisition module, the first judgment module and the third judgment module, and the first control module and the sixth control module. The embodiment of the present disclosure is not so limited. Further, those skilled in art can understand that the first state and the second state when the power adapter according to the third embodiment of the present disclosure is used alone correspond to the third state and the fourth state when the power adapter according to the third embodiment of the present disclosure is combined with the power adapter according to the first embodiment of the present disclosure, respectively.

Further, those skilled in the art also can understand that the same name may be used to express different elements in different embodiments. For example, the first acquisition module, the first judgment module and the first control module are included in both the power adapter according to the first embodiment of the present disclosure and the power adapter according to the third embodiment of the present disclosure, but the above components should not be constructed as the same components, because they perform different functions in different embodiments. The embodiment of the present disclosure is not so limited.

The following description is based on a case that the function of the power adapter according to the third embodiment of the present disclosure is applied to the power adapter according to the first embodiment of the present disclosure.

In the third embodiment of the present disclosure, the third state and the fourth state may be a single state, respectively, such as one of the S0, S1, S2, S3, S4 and S5, or each includes a plurality of states, for example, the third state may include S0, and the fourth state may include S3, S4 and S5.

If the third state or the fourth state includes a plurality of states, the following conditions should be ensured:

the power consumption of the portable computer in any third state is larger than that of the portable computer in any fourth state.

In the third embodiment of the present disclosure, the third state and the fourth state may be following combinations:

the third state includes the S0 state, and the fourth state includes the S1, S2 states; or the third state includes the S0 state, and the fourth state includes the S3, S4, S5 states; or the third state includes the S0, S1, S2 states, and the fourth state includes the S4, S5 states; or the third state includes the S0, S2 states, and the fourth state includes the S3, S4, S5 states.

Of course the third state and the fourth state may be divided in other manners, and the details are omitted herein.

The state of the portable computer includes the third state and the fourth state from the above description, but it also may include a fifth state. For example, the third state includes the S0 state, the fourth state includes the S1, S2 states, and the fifth state includes the S4, S5 states.

The various divisions of the above states are omitted herein.

The output voltage of the second power supplying module in the above-described various states may be determined according to a model of the portable computer, a type of a mainboard, a model of the CPU, and other information. For example, the output voltage of the second power supplying module in the S0 state should not be lower than a lowest voltage required for ensuring the portable computer to operate normally, and the output voltage of the second power supplying module in the S3, S4 and S5 states should not lower than a lowest voltage required for enabling the portable computer to be waken up. This data may be acquired according general experiments or product data.

For example, when the portable computer is in the S3 state, the output voltage of the second power supplying module is decreased by 0.1V from the current voltage at which the portable computer can be waken up, and then it is judged that whether the portable computer could be waken up at the decreased voltage. If yes, the output voltage of the second power supplying module is decrease by 0.1V again and the above process is repeated until the portable computer could not be waken up. At this time, the output voltage prior to the last output voltage is the lowest voltage in the S3 state.

Of course, by modifying the step of the voltage change, a more precise data could be obtained.

The above parameter may be included in specifications of some produce, and it may be obtained and used directly.

Of course, in the detailed embodiment of the present disclosure, considering that most of the portable computer may use the chargeable battery and if the chargeable battery is charged, the power adapter is needed to supply voltage at which the portable computer operates in the S0 state. In this case, the output voltage of the second power supplying module would not be decreased even if the portable computer operates in the state having low power consumption (such as S4, S5 state and the like). In view of this, the power adapter according to the third embodiment of the present disclosure further comprises:

a seventh acquisition module for interacting with the portable computer so as to acquire a battery state judging parameter;

a seventh control module for turning off the sixth control module when it is judged that the portable computer is connected with a chargeable power supply which is in a charging state according to the battery state judging parameter, and turning on the sixth control module otherwise.

In the third embodiment of the present disclosure, a mode judging parameter may be acquired and the current state of the portable computer may be judged according to the mode judging parameter in many manners.

For example, the mode judging parameter may be a state parameter of the portable computer.

When the mode judging parameter includes a current power consumption of the portable computer, the third judgment module further comprises:

a seventh unit for comparing the current power consumption and a third threshold and a fourth threshold;

a eighth unit for judging the current state of the portable computer as the third state when the current power consumption is larger than or equal to the third threshold;

a ninth unit for judging the current state of the portable computer as the fourth state when the current power consumption is smaller than or equal to the fourth threshold;

wherein the third threshold is a minimum power consumption in the third state of the portable computer;

the fourth threshold is a maximum power consumption in the fourth state of the portable computer, or a sum of the maximum power consumption and a margin threshold.

When the mode judging parameter includes the current power consumption and duration of the portable computer, the third judgment module further comprises:

a seventh unit for comparing the current power consumption and a third threshold and a fourth threshold;

a tenth unit for judging the current state of the portable computer as the third state when the current power consumption is larger than or equal to the third threshold and the duration exceeds a fifth time threshold;

a eleventh unit for judging the current state of the portable computer as the fourth state when the current power consumption is smaller or equal to the fourth threshold and the duration exceeds a sixth time threshold;

wherein the third threshold is a minimum power consumption in the third state of the portable computer;

the fourth threshold is a maximum power consumption in the fourth state of the portable computer, or a sum of the maximum power consumption and a margin threshold.

When the mode judging parameter further comprises the state parameter of the portable computer, the third judgment module further comprises:

a twelfth unit for judging the current state of the portable computer according to the state parameter when the current power consumption is smaller than the third threshold and larger than the fourth threshold.

The details are described as follows, respectively.

<Implementation 1>

In the Implementation 1, the mode judging parameter includes the state parameter of the portable computer.

The operation process of the power adapter will be described thereafter, wherein, as an example, the third state includes the S0, S2 state, the fourth state includes the S3, S4, S5 states, and the portable computer operates the S0 state therebefore.

The power adapter is connected to the portable computer so as to acquire the state parameter of the portable computer.

It is judged whether the current state of the portable computer belongs to the third state or the fourth state according to the state parameter. If it belongs to the third state (such as the S4 state), the output voltage of the second power supplying module is decreased to a value preset previously, otherwise the output voltage of the second power supplying module is maintained.

In the above implementation, the state parameter is needed to be transferred between the power adapter and the portable computer, so a PIN for transferring the data is correspondingly added at the power adapter and the portable computer end in the Implementation 1.

The detailed embodiment of the present disclosure is not limited to any detailed communication mode, and any communication manner that enables the communication between an external equipment and the portable computer may be used to transfer the state parameter, therefore their details are omitted herein.

<Implementation 2>

When the state parameter is acquired from the portable computer directly, errors may occur during a receiving process of the data considering that electromagnetic interference in the power adapter itself is large. Therefore the mode judging parameter includes the current power consumption of the portable computer in the Implementation 2.

It will know that, combined with the description in the BACKGROUND, the devices being turned-off are different in each state of the S0-S5 states of the portable computer. For example, all of the devices operate in the state S0; the CPU is turned off in the state S1; only the memory operates in the state S3; and all of the devices are turned off in both state S4 and S5.

Because different devices operate in each state and thus the power consumption required to maintain devices operating are different in each state, the current power consumption of the portable computer is acquired directly and the state thereof is judged according to the current power consumption in the Implementation 2. The details will be described below.

The operation process of the power adapter will be described thereafter, wherein, as an example, the third state includes the S0, S2 states, the fourth state includes the S3, S4, S5 states, and the portable computer operates the S0 state therebefore.

Two thresholds are preset as follows:

a third threshold A3: a minimum value of the power consumption of the portable computer, for the S0, S2 states;

a fourth threshold A4, a maximum value of the power consumption of the portable computer, for the S3, S4, S5 states.

Wherein A3 is larger than the A4.

Then the current power consumption A is acquired from the portable computer and a relationship between A and A3, A4 is judged. Generally, there are several relationships as follows no matter which state the portable computer is in:

A is larger than or equal to A3; or

A is smaller than or equal to A4.

If A is larger than or equal to A3, it indicates that the current state of the portable computer is the S0 or S2 state, because the A3 is the minimum value of the power consumption of the portable computer, for the S0, S2 states;

if A is smaller than or equal to A4, it indicates that the current state of the portable computer is the S3, S4 or S5 state, because the A4 is the maximum value of the power consumption of the portable computer, for the S3, S4, S5 states.

Of course, considering that the power consumption may increase due to aging of the equipments after the portable computer is used for a long time, following judging manner may be further used.

Judging the relationship between the current power consumption A of the portable computer and A3, A4+Δ (a margin threshold), and there are generally several relationships as follows no matter which state the portable computer is in:

A is larger than or equal to A3; or

A is smaller than or equal to A4+Δ.

If A is larger than or equal to A3, it indicates that the current state of the portable computer is the S0 or S2 state, because the A3 is the minimum value of the power consumption of the portable computer, for S0, S2 states;

if A is smaller than or equal to A4+Δ, it indicates that the current state of the portable computer is the S3, S4 or S5 state, because the A4 is the maximum value of the power consumption of the portable computer, for S3, S4, S5 states, even if the factors of aging, measurement error and the like are considered.

<Implementation 3>

The state parameter is acquired directly from the portable computer in the Implementation 1, so errors may occur during the receiving process of the data considering that electromagnetic interference in the power adapter itself is large. The judgment is made according to the current power consumption of the portable computer in the Implementation 2, but a power consumption jump problem of the portable computer due to external factors is not taken into account. Therefore, the mode judging parameter includes the current power consumption and duration of the portable computer in the Implementation 3.

It will know that, combined with the description in the BACKGROUND, the devices being turned-off are different in each state of the S0-S5 states of the portable computer. For example, all of the devices operate in the state S0; the CPU is turned off in the state S1; only the memory operates in the state S3; and all of the devices are turned off in both state S4 and S5.

Because different devices operate in each state and thus the power consumption required to maintain devices operating are different in each state, the current power consumption of the portable computer is acquired directly and the state thereof is judged according to the current power consumption and the duration in the Implementation 3. The details will be described below.

The operation process of the power adapter will be described thereafter, wherein, as an example, the third state includes the S0, S2 states, the fourth state includes the S3, S4, S5 states, and the portable computer operates the S0 state therebefore.

Two thresholds are preset as follows:

a third threshold A3: a minimum value of the power consumption of the portable computer, for the S0, S2 states;

a fourth threshold A4, a maximum value of the power consumption of the portable computer, for the S3, S4, S5 states.

Wherein A3 is larger than the A4.

Then the current power consumption A is acquired from the portable computer and a relationship between A and A3, A4 is judged. Generally, there are several relationships as follows no matter which state the portable computer is in:

A is larger than or equal to A3, and the duration exceeds a fifth time threshold T5; or A is smaller than or equal to A4, and the duration exceeds a sixth time threshold T6; or A is larger than or equal to A3, and the duration does not exceed the fifth time threshold T5; or A is smaller than or equal to A4, and the duration does not exceed the sixth time threshold T6.

It indicates that no power consumption jump due to the external factors exists when the duration exceeds the fifth time threshold T5 or the sixth time threshold T6. And it indicates that power consumption jump due to the external factors maybe exist if the duration does not exceed the fifth time threshold T5 or the sixth time threshold T6.

With respect to the Implementation 2, a factor of duration is added so as to avoid the problem of misjudgment result from the power consumption jump of the portable computer due to the external factors.

If A is larger than or equal to A3 for a period of time, it indicates that the current state of the portable computer is the S0 or S2 state, because the A3 is the minimum value of the power consumption of the portable computer, for the S0, S2 states;

if A is smaller than or equal to A4 for a period of time, it indicates that the current state of the portable computer is the S3, S4 or S5 state, because the A4 is the maximum value of the power consumption of the portable computer, for the S3, S4, S5 states Of course, based on the same reason, considering that the power consumption may increase due to aging of the equipments after the portable computer is used for a long time, following judging manner may be further used.

Judging the relationship between the current power consumption A of the portable computer and A3, A4+Δ (a margin threshold), and there are generally several relationships as follows no matter which state the portable computer is in:

A is larger than or equal to A3, and the duration exceeds the T5; or

A is smaller than or equal to A4+Δ, and the duration exceeds the T6; or

A is larger than or equal to A3, and the duration does not exceed the T5; or

A is smaller than or equal to A4+Δ, and the duration does not exceed the T6.

If A is larger than or equal to A3 for a period of time, it indicates that the current state of the portable computer is the S0 or S2 state, because the A3 is the minimum value of the power consumption of the portable computer, for S0, S2 states;

if A is smaller than or equal to A4+Δ for a period of time, it indicates that the current state of the portable computer is the S3, S4 or S5 state, because the A4 is the maximum value of the power consumption of the portable computer, for S3, S4, S5 states, even if the factors of aging, measurement error and the like are considered.

Of course the T5 and T6 may be set as the same time value or different time value.

<Implementation 4>

The state parameter is acquired directly from the portable computer in the Implementation 1, so errors may occur during the receiving process of the data considering that electromagnetic interference in the power adapter itself is large. The judgment is made according to the current power consumption of the portable computer in the Implementation 2, but there is a problem that a power consumption jump of the portable computer due to external factors and measurement error are not taken into account. Therefore, the mode judging parameter includes the current power consumption and the state parameter of the portable computer in the Implementation 4.

It will know that, combined with the description in the BACKGROUND, the devices being turned-off are different in each state of the S0-S5 states of the portable computer. For example, all of the devices operate in the state S0; the CPU is turned off in the state 51; only the memory operates in the state S3; and all of the devices are turned off in both state S4 and S5.

Because different devices operate in each state and thus the power consumption required to maintain devices operating are different in each state, the current power consumption of the portable computer is acquired directly and the state thereof is judged according to the duration of the portable computer with the current power consumption and the state parameter of the portable computer in the Implementation 4. The details will be described below.

The operation process of the power adapter will be described thereafter, wherein, as an example, the third state includes the S0, S2 states, the fourth state includes the S3, S4, S5 states, and the portable computer operates the S0 state therebefore.

Two thresholds are preset as follows:

a third threshold A3: a minimum value of the power consumption of the portable computer, for the S0, S2 states;

a fourth threshold A4, a maximum value of the power consumption of the portable computer, for the S3, S4, S5 states.

Wherein A3 is larger than the A4.

Then the current power consumption A is acquired from the portable computer and a relationship between A and A3, A4 is judged. Generally, there are several relationships as follows no matter which state the portable computer is in, considering the factors such as aging of equipment, measurement error and the like:

A is larger than or equal to A3; or

A is smaller than or equal to A4; or

A is larger than A4 but is smaller than A3.

If A is larger than or equal to A3, it indicates that the current state of the portable computer is the S0 or S2 state, because the A3 is the minimum value of the power consumption of the portable computer, for the S0, S2 states;

if A is smaller than or equal to A4, it indicates that the current state of the portable computer is the S3, S4 or S5 state, because the A4 is the maximum value of the power consumption of the portable computer, for the S3, S4, S5 states.

If A is between A3 and A4, it may further judge according to the state parameter of the portable computer.

Based on the same reasons, a factor of duration may also be added to the Implementation 4 so as to avoid the problem of misjudgment result from the power consumption jump of the portable computer due to the external factors.

Figure 8:
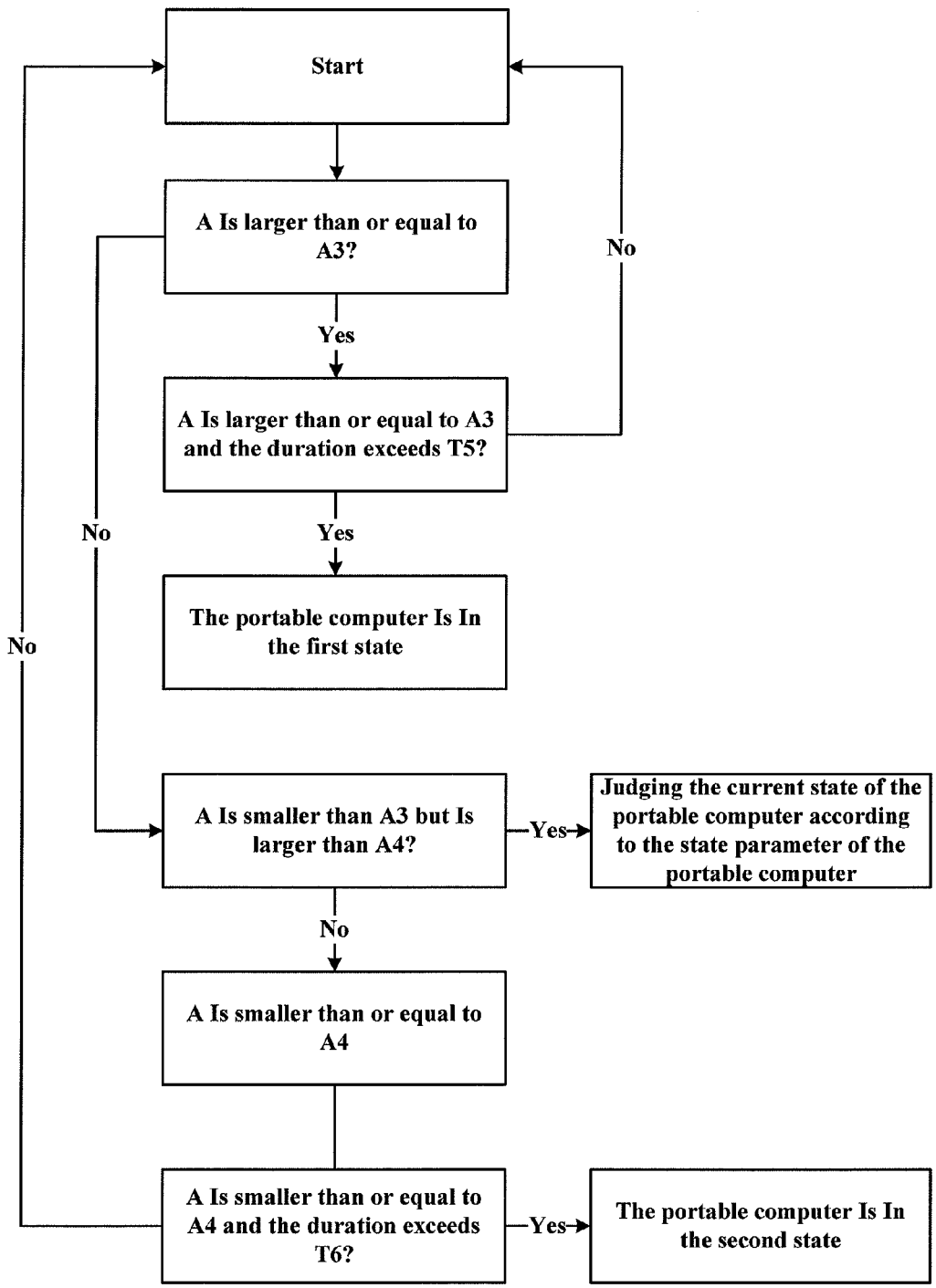
FIG. 8 is a schematic flowchart illustrating a fourth judgment state according to the third embodiment of the present disclosure.

A processing flow in the Implementation 4 after adding the factor of duration, that is, after the fifth time threshold T5 and the sixth time threshold T6 are set, is illustrated as in FIG. 8.

In the above-described embodiments of the present disclosure, the current power consumption of the portable computer may be acquired in the following manners.

The power adapter further comprises a resistance element disposed on an output channel of the output shaping unit;

the sixth acquisition module further comprises:

a current detection element for detecting the current of the resistance element;

a voltage detection element for detecting the output voltage of the output shaping unit;

wherein the current power consumption of the portable computer is a product of the current of the resistance element and the output voltage of the output shaping unit.

Or, a resistor may be connected to the output terminal of the power adapter in series, thus a current of the resistor and the current output voltage of the power adapter may be detected to obtain the current power consumption of the portable computer by multiplying the current and the output voltage.

Of course, since a resistor is generally connected to a Direct Current input terminal of the portable computer in series, the current power consumption of the portable computer also can be obtained by detecting a current and a voltage of the resistor and calculating the current power consumption of the portable computer by using the detected current and voltage. Then, the calculated current power consumption may be transferred to the power adapter by the portable computer via a data channel.

In the third embodiment of the present disclosure, the voltage supplied to the mainboard is controlled according to the current state of the power supply of the portable computer and the energy requirement. Particularly, the voltage supplied to the mainboard is small when the portable computer is in the third state having low power consumption, and the voltage supplied to the mainboard is large when the portable computer is in the fourth state having low power consumption. Thus, the energy consumption is reduced as compared to a case that the existing power adapter constantly outputs a high voltage.

A further power adapter according to the first embodiment of the present disclosure is used to supply power to the portable computer and includes a pulse width modulation unit and an output shaping unit, wherein the power adapter further comprises:

a instruction receiving module for receiving a first control instruction or a second control instruction transmitted from the portable computer, wherein the first control instruction is an instruction transmitted when the portable computer is in a first state and an output voltage of the output shaping unit is larger than a first preset voltage threshold, the second control instruction is an instruction transmitted when the portable computer is in the first state and the output voltage of the power adapter is smaller than a second preset voltage threshold, the first preset voltage threshold being larger than or equal to the second preset voltage threshold;

a first control module for controlling the pulse width modulation unit to be in a turned-off state when the instruction receiving unit receives the first control instruction, and for controlling the pulse width modulation unit to be in an operation state when the instruction receiving unit receives the second control instruction.

A switch which is in a turned-on state initially is further disposed in the power adapter, the first control module is connected with the switch and is used to make the pulse width modulation unit in the turned-off state or the operation state by controlling the switch to be turned-off or turned-on, respectively.

The configuration of the switch has been described in details previously, so its description is omitted herein.

In the above-described power adapter, the acquisition and judgment of the parameter is implemented at the portable computer end, while the power adapter end controls the turning on or off of the pulse width modulation unit directly according to the control instruction, thus the circuit scale of the power adapter is reduced and the manufacture cost of the power adapter is saved. Furthermore, acquiring the state parameter of the portable computer itself at the portable computer end facilitates a technology implementation.

It has mentioned that the function of the power adapter according to the second embodiment of the present disclosure may be used by combining with the function of the power adapter according to the first embodiment of the present disclosure, or may be used alone. Those skilled in the art can understand that it is not necessary for the above-described power adapter to comprise the first acquisition module for acquiring the output voltage of the output shaping unit, the first judging module for judging the relationship between the output voltage and preset voltage thresholds, and the first control module for controlling the pulse width modulation unit according to the judgment result in the power adapter according to the first embodiment of the present disclosure, when the function of the power adapter according to the second embodiment of the present disclosure is used alone.

Thus, a power adapter according to the second embodiment of the present disclosure is used for supplying power to a portable computer in which a build-in power supply is disposed, wherein the power adapter comprises:

a first power supplying module for supplying power to the portable computer;

a switch disposed in a power supplying loop of the first power supplying module and being in a turned-on state initially;

a first acquisition module for acquiring a switch control parameter;

a first judgment module for judging whether the build-in power supply can support the portable computer to operate in a current state for a first preset period according to the switch control parameter;

a first control module for controlling the switch to be turned off when the build-in power supply can support the portable computer to operate in the current state for the first preset period, and controlling the switch to be turned on otherwise.

As described above, those skilled in the art can understand that the first acquisition module, the first judgment module and the first control module in the power adapter according to the second embodiment of the present disclosure perform the same functions, respectively, as the second acquisition module, the second judgment module and the second control module when the function of the power adapter according to the second embodiment of the present disclosure is used by combining with the function of the power adapter according to the first embodiment of the present disclosure, although their names are different. Further, the first acquisition module, the first judgment module and the first control module in the power adapter according to the second embodiment of the present disclosure perform the different functions, respectively, from the first acquisition module, the first judgment module and the first control module when the function of the power adapter according to the second embodiment of the present disclosure is used by combining with the function of the power adapter according to the first embodiment of the present disclosure, although their names are same. Therefore, in the above respective embodiments of the present disclosure, the terms of "first", "second" and the like are only for convenience of description, but not intend to express any same or different relationship among the corresponding elements. Those skilled in the art can understand the detailed functions performed by each module or unit and the meanings of each special state and parameter according to the explanation in the specification without being confused.

Furthermore, the function of the power adapter according to the second embodiment of the present disclosure may also be used by combining with the function of the power adapter according to the third embodiment of the present disclosure. That is, the power adapter is completely turned-off when a build-in power supply can support the portable computer to operate for a predetermined period according to the state that the portable computer is in currently so as to reduce the energy consumption, while the energy storage elements supply power to the portable computer with energy stored during the normal operation process so as to increase the efficiency of the power adapter.

Except for the first power supplying module, the switch, the first acquisition module, the first judgment module and the first control module, the above-described power adapter further comprises:

a second acquisition module for acquiring a mode judging parameter;

a second judgment module for judging a current state of the portable computer according to the mode judging parameter;

a second control module for controlling an output voltage of the build-in power supply according to the current state of the portable computer, so that the voltage output by the build-in power supply when the current state of the portable computer is a first state is larger than the voltage output by the build-in power supply when the current state of the portable computer is a second state;

wherein a power consumption in the first state of the portable computer is larger than that in the second state of the portable computer.

Another power adapter according to the second embodiment of the present disclosure is used for supplying power to a portable computer, wherein the power adapter comprises:

a first power supplying module for supplying power to the portable computer;

a switch disposed in a power supplying loop of the first power supplying module and being in a turned-on state initially;

a first control module for controlling the switch to be turned off upon receiving a control instruction issued after the portable computer judges that a build-in power supply can support the portable computer to operate in the current state for a first preset period, and controlling the switch to be turned on otherwise.

In the above-described power adapter, a power consumption in the first state of the portable computer is smaller than a preset value, the control instruction is an instruction transmitted when the current state of the portable computer is a first state and the build-in power supply can support the portable computer to operate in the current operation state for the first preset period, and a power consumption in the first state of the portable computer is smaller than a preset value.

An example of the operation process of the above power adapter will be described in details thereafter.

If the user leaves for a period of time and the portable computer enters the stand-by state, and it is found that the build-in power supply can support the portable computer to operate in the current state for a preset period, a control instruction is transmitted to the power adapter so as to indicate the power adapter to turn of the switch. The power adapter control the switch to be turned off according to the instruction, and the portable computer is supplied power by the build-in power supply. If the build-in power supply can support the portable computer to operate in the stand-by state for the preset period, the control instruction is continuously transmitted to the power adapter to ensure the switch being turned off.

After the user returns and starts up the portable computer, the portable computer enters the operation state. The portable computer finds that the build-in power supply cannot support the portable computer to operate in the operation state for the preset period at the same time, the transmission of the control instruction is stopped. The power adapter would control the switch to be turned on if no control instruction is received, so that the portable computer is supplied power by the power adapter.

If the user goes out and does not return for a long time, which results in that the build-in power supply cannot support the portable computer to operate in the stand-by state for the preset period, the portable computer would stop transmitting the control instruction to the power adapter. The power adapter would control the switch to be turned on if no control instruction is received, so that the portable computer is supplied power by the power adapter.

This process is repeated, so that the electronic loop of the power adapter can be disconnected without detaching the power adapter by the user, which contributes to power saving and simplifies the operations of the user.

In the above-described power adapter, the acquisition and judgment of the parameter is implemented at the portable computer end, while the power adapter end controls the turning on or off of the pulse width modulation unit directly according to the control instruction, thus the circuit scale of the power adapter is reduced and the manufacture cost of the power adapter is saved. Furthermore, acquiring the state parameter of the portable computer itself at the portable computer end facilitates a technology implementation.

It has mentioned that the function of the power adapter according to the third embodiment of the present disclosure may be used by combining with the function of the power adapter according to the first embodiment of the present disclosure, or may be used alone. Those skilled in the art can understand that it is not necessary for the above-described power adapter to comprise the first acquisition module for acquiring the output voltage of the output shaping unit, the first judging module for judging the relationship between the output voltage and a preset voltage threshold, and the first control module for controlling the pulse width modulation unit according to the judgment result in the power adapter according to the first embodiment of the present disclosure, when the function of the power adapter according to the third embodiment of the present disclosure is used alone.

Thus, a power adapter according to the third embodiment of the present disclosure is used for supplying power to a portable computer in which a build-in power supply is disposed, wherein the power adapter comprises:

a first power supplying module for supplying power to the portable computer;

a first acquisition module for acquiring a mode judging parameter;

a first judgment module for judging a current state of the portable computer according to the mode judging parameter;

a first control module for controlling an output voltage of the first power supplying module according to the current state of the portable computer, so that the voltage output by the first power supplying module when the current state of the portable computer is a first state is larger than the voltage output by the first power supplying module when the current state of the portable computer is a second state;

wherein a power consumption in the first state of the portable computer is larger than that in the second state of the portable computer.

Similarly, the terms of "first", "second" and the like as used herein do not intend to limit the element (such as corresponding module) or parameter (such as state).

As described above, the power adapters according to the first and second embodiments of the present disclosure are more reliable as being applied to the state having low power consumption of the portable computer, because both the output voltage supplied by the pulse width modulation unit and the output voltage supplied by the build-in power supply are lower than the output voltage supplied by the power supplying module in the power adapter itself. Therefore, as being combined with the function of the power adapter according to the above-described embodiments of the present disclosure, the power adapter according to the third embodiment of the present disclosure may utilize the output voltage supplied by the pulse width modulation unit or the output voltage supplied by the build-in power supply when it is judged that the current state of the portable computer is the second state having low power consumption.

As described above, the above-described power adapter further comprises:

a pulse width modulation unit and an output shaping unit whose initial states are operation states;

a second acquisition module for acquiring an output voltage of the output shaping unit, a second judgment module for judging relationships between the output voltage and a first preset voltage threshold and a second preset voltage threshold and obtaining a judgment result, the first preset voltage threshold being larger than or equal to the second preset voltage threshold;

a second control module for controlling the pulse width modulation unit to be in a turned-off state when the first judgment module judges that the current state of the portable computer is a second state and the second judgment module judges that the output voltage is larger than the second preset voltage threshold, and for controlling the pulse width modulation unit to be in the operation state otherwise.

In the above-described power adapter, the portable computer comprises a build-in power supply for supplying power, the power adapter further comprises:

a switch disposed in a power supplying loop of the first power supplying module and being in a turned-on state initially;

a third acquisition module for acquiring a switch control parameter of the switch;

a third judgment module for judging whether the build-in power supply can support the portable computer to operate in a current state for a first preset period according to the switch control parameter;

a third control module for controlling the switch to be turned off when the first judgment module judges that the current state of the portable computer is the second state and the second judgment module judges that the build-in power supply can support the portable computer to operate in the current operation state for the first preset period, and controlling the switch to be turned on otherwise.

Another power adapter according to the third embodiment of the present disclosure is used for supplying power to a portable computer, wherein the power adapter comprises:

a first power supplying module for supplying power to the portable computer;

a first control module for controlling the first power supplying module upon receiving a control instruction transmitted by the portable computer according to the current state of the portable computer, so that the voltage output by the first power supplying module when the current state of the portable computer is a first state is larger than the voltage output by the first power supplying module when the current state of the portable computer is a second state;

wherein a power consumption in the first state of the portable computer is larger than that in the second state of the portable computer.

In the above-described power adapter, the acquisition and judgment of the parameter is implemented at the portable computer end, while the power adapter end controls the turning on or off of the pulse width modulation unit directly according to the control instruction, thus the circuit scale of the power adapter is reduced and the manufacture cost of the power adapter is saved. Furthermore, acquiring the state parameter of the portable computer itself at the portable computer end facilitates a technology implementation.

The above description is for a case that the judgment, control and the like are performed at the power adapter end, but those skilled in the art can understand that the respective embodiments of the present disclosure may be implemented at the portable computer end.

A portable computer according to the first embodiment of the present disclosure comprises:

a first acquisition module for acquiring a state judging parameter of the portable computer and an output voltage of a power adapter;

a first judgment module for judging whether the portable computer is in a first state according to the state judging parameter, and judging relationships between the output voltage and a first preset voltage threshold and a second preset voltage threshold and obtaining a judgment result when it is judged that the portable computer is in the first state, the first preset voltage threshold being larger than or equal to the second preset voltage threshold;

a first control module for transmitting a first control instruction to the power adapter, which makes a pulse width modulation unit in the power adapter in a turned-off state, when the judgment result indicates that the output voltage is larger than the first preset voltage threshold, and for transmitting a second control instruction to the power adapter, which makes the pulse width modulation unit in the power adapter in an operation state, when the judgment result indicates that the output voltage is smaller than the second preset voltage threshold.

The output voltage of the power adapter may be obtained by directly measuring an input voltage at an adapter interface of the portable computer.

In the portable computer according to the first embodiments of the present disclosure, when the portable computer is in a state having a low power consumption, the pulse width modulation unit is controlled to be in the turned-off state and the energy storage elements in the output shaping unit supply power to the portable computer with stored energy, if the output voltage of the power adapter is larger than the first preset voltage threshold; and the pulse width modulation unit is controlled to be in the operation state and the power adapter supplies power to the portable computer and also the energy storage elements so as to supply power to the portable computer by the energy storage elements with the stored energy in a next turn, if the output voltage of the power adapter is smaller than the second preset voltage threshold. Therefore, all of the switch devices in the PWM module of the power adapter are in the turned-off state when a system operates with the surplus energy stored by the energy storage elements, and the longer the period in the turned-off state is, the smaller the energy consumed is. Since the power consumption of the switch devices in a light load situation occupies most of the entire power consumption of the power adapter, the embodiment of the present disclosure can notablely reduce the power consumption of the switch devices in the PWM module of the power adapter, in a light load situation, and thus can increase the efficiency of the power adapter.

A portable computer according to the second embodiment of the present disclosure has a build-in power supply, wherein the portable computer further comprises:

a first acquisition module for acquiring a switch control parameter;

a first judgment module for judging whether the build-in power supply can support the portable computer to operate in a current state for a first preset period according to the switch control parameter;

a first control module for transmitting a control instruction, which is used to make the power adapter turn off a switch according to the control instruction so that the build-in power supply supplies power, when the build-in power supply can support the portable computer to operate in the current state for the first preset period;

wherein the switch is disposed in a power supplying loop of a power supplying module in the power adapter and is in a turned-on state initially.

The switch control parameter includes a first parameter and a second parameter. The first judgment module is used to judge whether the current state of the portable computer is a first state in which the power consumption of the portable computer is lower than a preset value, according to the first parameter and the second parameter, and to judge whether the build-in power supply can support the portable computer to operate in the current state for the first preset period;

the first control module is used to transmit the control instruction when the current state of the portable computer is the first state and the build-in power supply can support the portable computer to operate in the current state for the first preset period.

Wherein the portable computer comprises a chargeable power supply internally, and considering charging of a battery, the portable computer further comprises:

a second acquisition module for acquiring a battery state judging parameter;

a second control module for turning off the first control module when it is judged that the chargeable power supply is in a charging state according to the battery state judging parameter, and turning on the first control module otherwise.

The first parameter includes:

state parameter of the portable computer; or current power consumption of the portable computer; or the current power consumption and duration of the portable computer.

In the above-described embodiment of the present disclosure, the power adapter is completely turned-off when the build-in power supply can support the portable computer to operate for a predetermined period, therefore the energy consumption brought by the power adapter itself as it operates is reduced when a user does not detach the power adapter.

A portable computer according to the third embodiment of the present disclosure comprises:

a mainboard;

a first power supplying module which is connected with the mainboard and is used to supply power to the mainboard after acquiring power from an adapter;

a first parameter acquisition module for acquiring a mode judging parameter;

a first state judgment module for judging a current state of the portable computer according to the mode judging parameter;

a first control module for controlling an output voltage of the first power supplying module according to the current state of the portable computer, so that the voltage output by the first power supplying module when the current state of the portable computer is a first state is larger than the voltage output by the first power supplying module when the current state of the portable computer is a second state;

wherein a power consumption in the first state of the portable computer is larger than that in the second state of the portable computer.

The above-described portable computer may further comprises:

a second parameter acquisition module for acquiring a battery state judging parameter;

a second control module for turning off the first control module when it is judged that the portable computer is connected with a chargeable power supply which is in a charging state according to the battery state judging parameter, and turning on the first control module otherwise.

In the description for the power adapter and the portable computer according to the third embodiment of the present disclosure, the idea of the present disclosure is implemented at the power adapter end or the portable computer end separately, but another solution wherein the power adapter end and the portable computer end cooperates with each other so as to implement the idea of the present disclosure may also be provided according to the third embodiment of the present disclosure. In this implementation, a portable computer according to the third embodiment of the present disclosure comprises:

a first acquisition module for acquiring a mode judging parameter;

a first judgment module for judging a current state of the portable computer according to the mode judging parameter;

a first control module for transmitting a control instruction to a power adapter in order to control an output voltage of the power adapter according to the current state of the portable computer, so that the voltage output by the power adapter when the current state of the portable computer is a first state is larger than the voltage output by the power adapter when the current state of the portable computer is a second state;

wherein a power consumption in the first state of the portable computer is larger than that in the second state of the portable computer.

Similarly, when the idea of the present disclosure is implemented at the portable computer end, the following modules are required to be disposed with considering a charging state:

a second parameter acquisition module for acquiring a battery state judging parameter;

a second control module for turning off the first control module when it is judged that the chargeable power supply is in a charging state according to the battery state judging parameter, and turning on the first control module otherwise.

The solution implemented at the portable computer end differs from the solution implemented at the power adapter end only in that a data transmission between the portable computer and the power adapter is different. As for the solution implemented at the portable computer end, the control signal is transferred and the power adapter end adjusts its output voltage according to the control signal; and as for the solution implemented at the power adapter end, the mode judging parameter is transferred between the power adapter and the portable computer and the judgment of the state is made by the power adapter end. Anyway, how to judge the judgment is same in these two solutions, and the detailed description is omitted herein.

If the process is performed by the portable computer end, that is, the mode judging parameter is the current power consumption of the portable computer, since a resistor is generally connected to a Direct Current input terminal of the portable computer in series, the current power consumption of the portable computer can be obtained by detecting a current and a voltage of the resistor and calculating the current power consumption of the portable computer by using the detected current and voltage.

Whether the solution according to the third embodiment of the present disclosure is implemented at the power adapter end or at the portable computer end, the output voltage of the first power supplying module in the power adapter should be changed. In particular, the power adapter always utilizes a feedback control and adjusts the output voltage according to a difference value between the output voltage and a reference voltage, such that the output voltage is close to the reference voltage as much as possible. Therefore, in the solutions according to the third embodiment of the present disclosure, the output voltage can be changed by simply adjusting the reference voltage of the power adapter.

Those skilled in the art can understand that the above-described respective feature(s) of the power adapter in the solutions according to the first to third embodiments of the present disclosure could be applied arbitrarily to the portable computer in the above-described solutions according to the first to third embodiments of the present disclosure, as long as the feature(s) of the power adapter could be combined with the corresponding solution of the portable computer. Each of such combined solutions should be considered as one embodiment of the present disclosure. Therefore, the description for the embodiments of present disclosure does not intend to make any limitation.

Further, as described above, when the features in solutions of respective embodiments are combined with each other, the terms of "first", "second" and the like as used for describing the solutions does not intend to define any particular relationship among the corresponding elements or parameters. Instead, those skilled in the art can understand the implementations from the detailed functions performed by, and the detailed meanings of, the corresponding elements or parameters, and the description for the embodiments of present disclosure does not intend to make any limitation.

The above are only exemplary embodiments of the disclosed solution, but the scope sought for protection is not limited thereto. It should be noted that, many modifications or replacements can be made without departing from the scope of the present invention. These modifications or replacements should be considered as falling into the scope of the present disclosure.

What is claimed is:

1. A power adapter for supplying power to a portable computer and comprising a pulse width modulation unit and an output shaping unit whose initial states are operation states, wherein the power adapter further comprises:

a first acquisition module for acquiring an output voltage of the output shaping unit, a first judgment module for judging relationships between the output voltage and a first preset voltage threshold and a second preset voltage threshold and obtaining a judgment result, the first preset voltage threshold being larger than or equal to the second preset voltage threshold; and a first control module for controlling the pulse width modulation unit to be in a turned-off state when the judgment result indicates that the output voltage is larger than the first preset voltage threshold, and for controlling the pulse width modulation unit to be in an operation state when the judgment result indicates that the output voltage is smaller than the second preset voltage threshold and the pulse width modulation unit is in the turned-off state, wherein when the pulse width modulation unit is in the turned-off state, energy storage elements in the output shaping unit supply power to the portable computer by releasing the energy stored therein, wherein the portable computer comprises a build-in power supply for supplying power, wherein the power adapter further comprises:

a first power supplying module for supplying power to the portable computer;

a second switch which is disposed in a power supplying loop of the first power supplying module and is in a turned-on state initially;

a fourth acquisition module for acquiring a switch control parameter of the second switch;
a second judgment module for judging whether the build-in power supply can support the portable computer to operate in a current state for a third preset period according to the switch control parameter;
a fourth control module for controlling the second switch to be turned off when the build-in power supply can support the portable computer to operate in the current state for the third preset period, and controlling the second switch to be turned on otherwise,
wherein the switch control parameter includes a first parameter and a second parameter,
the second judgment module is used to judge whether the current state of the portable computer is a second state in which the power consumption of the portable computer is lower than a preset value, according to the first parameter and the second parameter, and to judge whether the build-in power supply can support the portable computer to operate in the current state for the third preset period when it is judged that the portable computer is in the second state;
the fourth control module is used to control the second switch to be turned off when the current state of the portable computer is the second state and the build-in power supply can support the portable computer to operate in the current state for the third preset period, and controlling the second switch to be turned on otherwise.

2. The power adapter as claimed in claim 1, wherein the power adapter further comprises:
a second acquisition module for acquiring a state judging parameter of the portable computer; and
the first judgment module judges whether the portable computer is in a first state according to the state judging parameter, and judges the relationships between the output voltage and the first preset voltage threshold and the second preset voltage threshold and obtains the judgment result when it is judged that the portable computer is in the first state;
the first control module is used to control the pulse width modulation unit to be in the turned-off state when the portable computer is in the first state and the output voltage is larger than the first preset voltage threshold, and to control the pulse width modulation unit to be in the operation state when the portable computer is in the first state and the output voltage is smaller than the second preset voltage threshold.

3. The power adapter as claimed in claim 2, wherein when the portable computer comprises a chargeable power supply internally, the power adapter further comprises:
a third acquisition module for interacting with the portable computer so as to acquire a battery state judging parameter; and
a second control module for turning off the first control module when it is judged that the chargeable power supply is in a charging state according to the battery state judging parameter, and turning on the first control module otherwise.

4. The power adapter as claimed in claim 3, wherein the state judging parameter includes:
state parameter of the portable computer; or
current power consumption of the portable computer; or
the current power consumption and duration of the portable computer in a current state.

5. The power adapter as claimed in claim 4, wherein when the state judging parameter includes the current power consumption of the portable computer, the first judgment module further comprises:
a first unit for comparing the current power consumption and a first threshold;
a second unit for judging a current state of the portable computer as the first state when the current power consumption is smaller than the first threshold;
wherein the first threshold is a maximum power consumption in the first state of the portable computer, or a sum of the maximum power consumption and a margin threshold.

6. The power adapter as claimed in claim 4, wherein when the state judging parameter includes the current power consumption and duration of the portable computer in a current state, the first judgment module further comprises:
a first unit for comparing the current power consumption and a first threshold;
a third unit for judging a current state of the portable computer as the first state when the current power consumption is smaller than the first threshold and the duration exceeds a second time threshold;
wherein the first threshold is a maximum power consumption in the first state of the portable computer, or a sum of the maximum power consumption and a margin threshold.

7. The power adapter as claimed in claim 5, wherein the power adapter further comprises:
a resistance element disposed on an output channel of the output shaping unit;
the second acquisition module further comprises:
a current detection element for detecting the current of the resistance element;
a voltage detection element for detecting the output voltage of the output shaping unit;
wherein the current power consumption of the portable computer is a product of the current of the resistance element and the output voltage of the output shaping unit.

8. The power adapter as claimed in claim 2, wherein a first switch which is in a turned-on state initially is further disposed in the power adapter, the first control module is connected with the first switch and is used to cause the pulse width modulation unit being in the turned-off state or the operation state by controlling the first switch to be turned off or on, respectively.

9. The power adapter as claimed in claim 8, wherein the power adapter further comprises:
a duration monitoring module for monitoring a duration during which the portable computer is in the first state when the first judgment module judges that the portable computer is in the first state according to the state judging parameter; and
a third control module for controlling the first control module to be turned off and controlling the first switch to be turned off, when the duration during which the portable computer is in the first state exceeds a first preset period.

10. The power adapter as claimed in claim 9, wherein the power adapter further comprises:
a notification module for transmitting a close instruction to the portable computer in order to make the portable computer be powered-off when the duration during which the portable computer is in the first state exceeds a second preset period.

11. The power adapter as claimed in claim 1, wherein when the portable computer comprises a chargeable power supply internally, the power adapter further comprises:
  a fifth acquisition module for interacting with the portable computer so as to acquire a battery state judging parameter;
  a fifth control module for turning off the fourth control module when it is judged that the chargeable power supply is in a charging state according to the battery state judging parameter, and turning on the fourth control module otherwise.

12. The power adapter as claimed in claim 1, wherein the first parameter includes:
  state parameter of the portable computer; or
  current power consumption of the portable computer; or
  the current power consumption and duration of the portable computer in a current state.

13. The power adapter as claimed in claim 12, wherein when the first parameter is the current power consumption of the portable computer, the second judgment module comprises:
  a fourth unit for comparing the current power consumption and a second threshold; and
  a fifth unit for judging the current state of the portable computer as the second state when the current power consumption is smaller than the second threshold;
  wherein the second threshold is a maximum power consumption in the second state of the portable computer, or a sum of the maximum power consumption and a margin threshold.

14. The power adapter as claimed in claim 12, wherein when the first parameter includes the current power consumption and duration of the portable computer in a current state, the second judgment module comprises:
  a fourth unit for comparing the current power consumption and a second threshold; and
  a sixth unit for judging the current state of the portable computer as the second state when the current power consumption is smaller than the second threshold and the duration exceeds a fourth time threshold;
  wherein the second threshold is a maximum power consumption in the second state of the portable computer, or a sum of the maximum power consumption and a margin threshold.

15. The power adapter as claimed in claim 12, wherein the first power supplying module comprises a conversion unit, and the second switch is disposed on a power supplying loop between the conversion unit and a main plug.

16. The power adapter as claimed in claim 1, wherein the power adapter further comprises:
  a second power supplying module for supplying power to the portable computer;
  a sixth acquisition module for acquiring a mode judging parameter;
  a third judgment module for judging a current state of the portable computer according to the mode judging parameter; and
  a six control module for controlling an output voltage of the second power supplying module according to the current state of the portable computer, so that the voltage output by the second power supplying module when the current state of the portable computer is a third state is larger than the voltage output by the second power supplying module when the current state of the portable computer is a fourth state;
  a power consumption in the third state of the portable computer being larger than that in the fourth state of the portable computer.

17. The power adapter as claimed in claim 16, wherein the power adapter further comprises:
  a seventh acquisition module for interacting with the portable computer so as to acquire a battery state judging parameter;
  a seventh control module for turning off the sixth control module when it is judged that the portable computer is connected with a chargeable power supply which is in a charging state according to the battery state judging parameter, and turning on the sixth control module otherwise.

18. The power adapter as claimed in claim 16, wherein, the mode judging parameter is a state parameter of the portable computer.

19. The power adapter as claimed in claim 16, wherein the mode judging parameter is the current power consumption of the portable computer, and the third judgment module further comprises:
  a seventh unit for comparing the current power consumption and a third threshold and a fourth threshold;
  an eighth unit for judging the current state of the portable computer as the third state when the current power consumption is larger than or equal to the third threshold; and
  a ninth unit for judging the current state of the portable computer as the fourth state when the current power consumption is smaller than or equal to the fourth threshold;
  wherein the third threshold is a minimum power consumption in the third state of the portable computer;
  the fourth threshold is a maximum power consumption in the fourth state of the portable computer, or a sum of the maximum power consumption and a margin threshold.

20. The power adapter as claimed in claim 16, wherein the mode judging parameter includes the current power consumption and duration of the portable computer in a current state, and the third state judgment module further comprises:
  a seventh unit for comparing the current power consumption and a third threshold and a fourth threshold;
  a tenth unit for judging the current state of the portable computer as the third state when the current power consumption is larger than or equal to the third threshold and the duration exceeds a fifth time threshold; and
  an eleventh unit for judging the current state of the portable computer as the fourth state when the current power consumption is smaller or equal to the fourth threshold and the duration exceeds a sixth time threshold;
  wherein the third threshold is a minimum power consumption in the third state of the portable computer;
  the fourth threshold is a maximum power consumption in the fourth state of the portable computer, or a sum of the maximum power consumption and a margin threshold.

21. The power adapter as claimed in claim 19, wherein the mode judging parameter further comprises the state parameter of the portable computer, and the third state judgment module further comprises:
  a twelfth unit for judging the current state of the portable computer according to the state parameter when the current power consumption is smaller than the third threshold and larger than the fourth threshold.

22. A power adapter used for supplying power to a portable computer, wherein the power adapter comprises:
  a first power supplying module for supplying power to the portable computer;

a first acquisition module for acquiring a mode judging parameter;

a first judgment module for judging a current state of the portable computer according to the mode judging parameter;

a first control module for controlling an output voltage of the first power supplying module according to the current state of the portable computer, so that the voltage output by the first power supplying module when the current state of the portable computer is a first state is larger than the voltage output by the first power supplying module when the current state of the portable computer is a second state;

wherein a power consumption in the first state of the portable computer is larger than that in the second state of the portable computer, and wherein the power adapter further comprises a pulse width modulation unit and an output shaping unit whose initial states are operation states;

a second acquisition module for acquiring an output voltage of the output shaping unit, a second judgment module for judging relationships between the output voltage and a first preset voltage threshold and a second preset voltage threshold and obtaining a judgment result, the first preset voltage threshold being larger than or equal to the second preset voltage threshold;

a second control module for controlling the pulse width modulation unit to be in a turned-off state when the first judgment module judges that the current state of the portable computer is a first state and the second judgment module judges that the output voltage is larger than the first preset voltage threshold, and for controlling the pulse width modulation unit to be in the operation state otherwise, when the pulse width modulation unit is in the turned-off state, energy storage elements in the output shaping unit supply power to the portable computer by releasing the energy stored therein, wherein the portable computer comprises a build-in power supply for supplying power, and the power adapter further comprises:

a switch disposed in a power supplying loop of the first power supplying module and being in a turned-on state initially;

a third acquisition module for acquiring a switch control parameter;

a third judgment module for judging whether the build-in power supply can support the portable computer to operate in a current state for a first preset period according to the switch control parameter;

a third control module for controlling the switch to be turned off when the first judgment module judges that the current state of the portable computer is the second state and the second judgment module judges that the build-in power supply can support the portable computer to operate in the current state for the first preset period, and controlling the switch to be turned on otherwise.

* * * * *